(12) United States Patent
Kurasawa et al.

(10) Patent No.: US 10,606,429 B2
(45) Date of Patent: *Mar. 31, 2020

(54) DISPLAY DEVICE

(71) Applicant: Japan Display Inc., Tokyo (JP)

(72) Inventors: Hayato Kurasawa, Tokyo (JP); Koji Noguchi, Tokyo (JP)

(73) Assignee: Japan Display Inc., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/421,129

(22) Filed: May 23, 2019

(65) Prior Publication Data

US 2019/0278403 A1  Sep. 12, 2019

Related U.S. Application Data

(63) Continuation of application No. 15/421,620, filed on Feb. 1, 2017, now Pat. No. 10,303,313.

(30) Foreign Application Priority Data

Mar. 22, 2016 (JP) .................................. 2016-057460

(51) Int. Cl.
  *G06F 3/044* (2006.01)
  *G06F 3/041* (2006.01)
(52) U.S. Cl.
  CPC ............ *G06F 3/044* (2013.01); *G06F 3/0412* (2013.01); *G06F 3/0416* (2013.01); *G06F 2203/04112* (2013.01)
(58) Field of Classification Search
  CPC ...... G06F 3/044; G06F 3/0412; G06F 3/0416; G06F 2203/04112
  See application file for complete search history.

(56) References Cited

U.S. PATENT DOCUMENTS

| 2002/0093609 A1* | 7/2002 | Baek ................. G02F 1/133555 |
| | | 349/113 |
| 2011/0267296 A1 | 11/2011 | Noguchi et al. |
| 2012/0075237 A1 | 3/2012 | Ikeda et al. |
| 2012/0262389 A1 | 10/2012 | Kida et al. |

(Continued)

FOREIGN PATENT DOCUMENTS

| JP | 2000-066837 A | 3/2000 |
| JP | 2013-191015 | 9/2013 |

(Continued)

OTHER PUBLICATIONS

Japanese Office Action dated Sep. 10, 2019 in corresponding Japanese Application No. 2016-057460.

*Primary Examiner* — Ariel A Balaoing
(74) *Attorney, Agent, or Firm* — K&L Gates LLP

(57) ABSTRACT

A display device includes a substrate, a plurality of pixel electrodes, a switching element, and a first electrode. The substrate has a first surface and a second surface opposite to the first surface. The pixel electrodes are provided to the first surface side and supplied with a pixel signal for displaying an image. The switching element is provided to the first surface side and coupled to the pixel electrodes. The first electrode is provided to a layer closer to the first surface than the switching element in a manner facing the switching element in a direction perpendicular to the first surface of the substrate and having lower light transmittance than that of the substrate.

18 Claims, 29 Drawing Sheets

(56) References Cited

U.S. PATENT DOCUMENTS

| | | |
|---|---|---|
| 2013/0234954 A1 | 9/2013 | Koide |
| 2013/0241869 A1 | 9/2013 | Kida et al. |
| 2014/0118639 A1 | 5/2014 | Matsushima |
| 2014/0210779 A1* | 7/2014 | Katsuta .................. G06F 3/044 345/174 |
| 2014/0292713 A1 | 10/2014 | Koito et al. |
| 2015/0220204 A1 | 8/2015 | Noguchi et al. |
| 2015/0220208 A1 | 8/2015 | Noguchi et al. |
| 2015/0370396 A1 | 12/2015 | Hotelling et al. |
| 2017/0045992 A1 | 2/2017 | Lee et al. |
| 2017/0090637 A1* | 3/2017 | Yoon ..................... G06F 3/0414 |

FOREIGN PATENT DOCUMENTS

| | | |
|---|---|---|
| JP | 2015-143933 | 8/2015 |
| JP | 2015-164033 | 9/2015 |

* cited by examiner

DISPLAY DEVICE

CROSS-REFERENCE TO RELATED APPLICATIONS

This application is a continuation of U.S. application Ser. No. 15/421,620, filed on Feb. 1, 2017, which application claims priority from Japanese Application No. 2016-057460, filed on Mar. 22, 2016, the contents of which are incorporated by reference herein in its entirety.

BACKGROUND

1. Technical Field

The present disclosure relates to a display device.

2. Description of the Related Art

Touch detection devices capable of detecting an external proximate object, what are called touch panels, have recently been attracting attention. Touch panels are mounted on or integrated with a display device, such as a liquid crystal display device, and used as display devices with a touch detection function. Display devices provided with a capacitance touch sensor are known as a type of display device with a touch detection function. Such display devices may possibly be expected to have multiple functions, such as a force detection function and a touch detection function on a surface opposite to a display surface, besides a function to detect touch input on the display surface. Japanese Patent Application Laid-open Publication No. 2000-66837 A, for example, discloses a force detecting digitizer that can detect a force applied to a display surface by a finger or the like and perform various types of functions depending on the magnitude of the force.

If detection electrodes are added to implement multiple functions, the number of laminated layers may possibly increase, making it difficult to reduce the thickness of the display devices. Because the display devices include switching elements coupled to pixel electrodes, the display devices may possibly have lower detection accuracy on the surface opposite to the display surface.

SUMMARY

According to one aspect, a display device includes a substrate having a first surface and a second surface opposite to the first surface, a plurality of pixel electrodes provided to the first surface side and supplied with a pixel signal for displaying an image, a switching element provided to the first surface side and coupled to the pixel electrodes, and a first electrode provided to a layer closer to the first surface than the switching element in a manner facing the switching element in a direction perpendicular to the first surface of the substrate and having lower light transmittance than light transmittance of the substrate.

DETAILED DESCRIPTION

Figure 1:
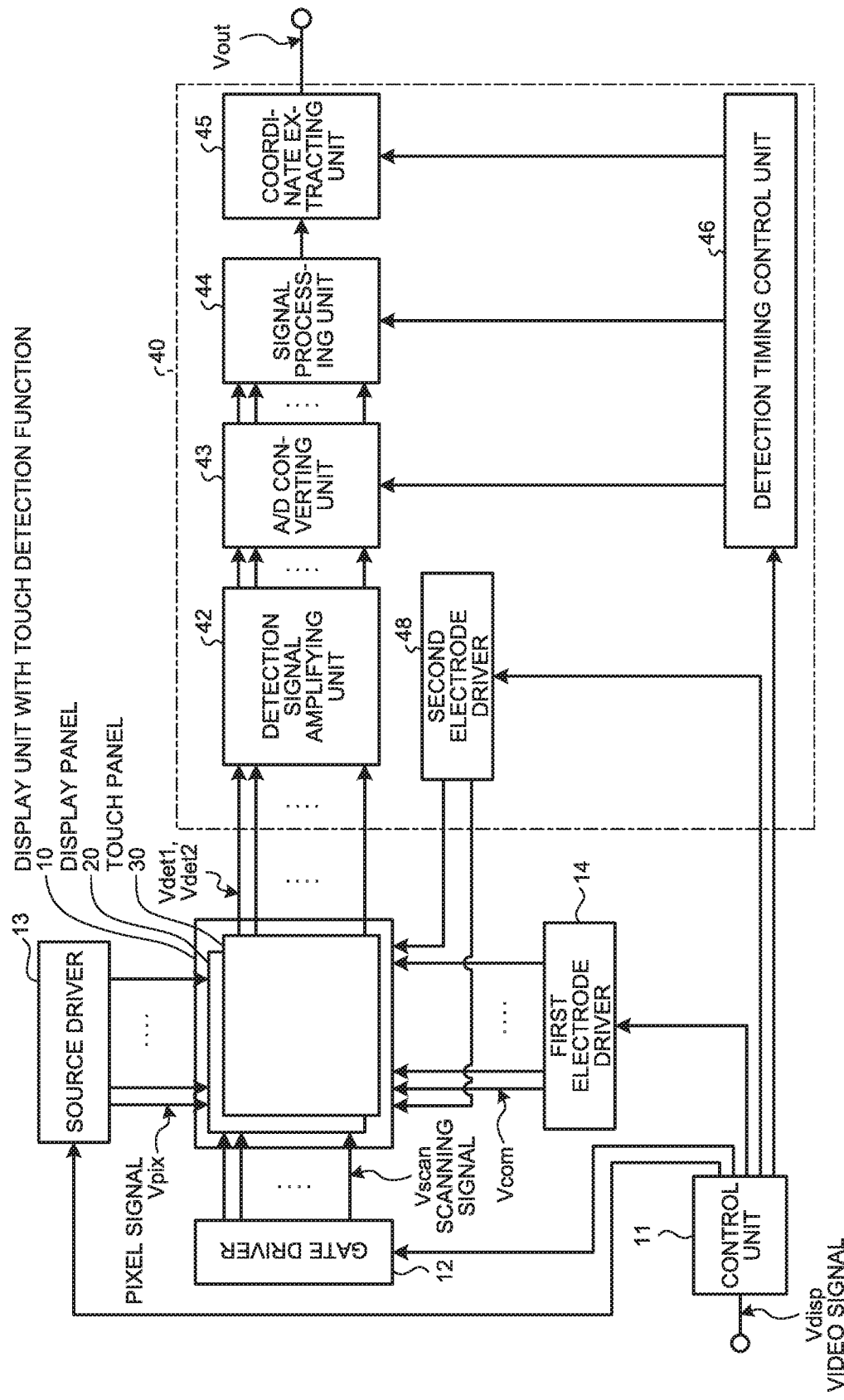
FIG. 1 is a block diagram of an exemplary configuration of a display device with a touch detection function according to a first embodiment.

Exemplary aspects (embodiments) to embody the present invention are described below in greater detail with reference to the accompanying drawings. The contents described in the embodiments are not intended to limit the present invention. Components described below include components easily conceivable by those skilled in the art and components substantially identical therewith. Furthermore, the components described below can be appropriately combined. The disclosure is given by way of example only, and various changes made without departing from the spirit of the invention and easily conceivable by those skilled in the art naturally fall within the scope of the invention. The drawings may possibly illustrate the width, the thickness, the shape, and other elements of each unit more schematically than the actual aspect to simplify the explanation. These elements, however, are given by way of example only and are not intended to limit interpretation of the invention. In the specification and the figures, components similar to those previously described with reference to preceding figures are denoted by like reference numerals, and overlapping explanation thereof will be appropriately omitted.

First Embodiment

FIG. 1 is a block diagram illustrating a configuration example of a display device with a touch detection function according to a first embodiment. As illustrated in FIG. 1, a display device with a touch detection function 1 includes a display unit with a touch detection function 10, a control unit 11, a gate driver 12, a source driver 13, a first electrode driver 14, and a detecting unit 40. The display device with a touch detection function 1 is a display device in which the display unit with a touch detection function 10 incorporates a touch detection function. The display unit with a touch detection function 10 is a device configured by integrating a display panel 20 using liquid crystal display elements as display elements and a touch panel 30 serving as a detection device for detecting a touch input. The display unit with a touch detection function 10 may be what is called an on-cell device configured by mounting the touch panel 30 on the display panel 20. The display panel 20 may be an organic electroluminescence (EL) display panel, for example.

The display panel 20 is an element that performs display by sequentially scanning one horizontal line at a time according to a scan signal Vscan supplied from the gate driver 12, as will be described later. The control unit 11 is a circuit that supplies a control signal to each of the gate driver 12, the source driver 13, the first electrode driver 14, and the detecting unit 40 based on an externally supplied video signal Vdisp, and thus controls these drivers and the detector so as to operate them in synchronization with one another.

The gate driver 12 has a function to sequentially select one horizontal line to be driven to perform display of the display unit with a touch detection function 10, based on the control signal supplied from the control unit 11.

The source driver 13 is a circuit that supplies a pixel signal Vpix to each sub-pixel SPix (described later) of the display unit with a touch detection function 10, based on the control signal supplied from the control unit 11.

The first electrode driver 14 is a circuit that supplies a first drive signal Vp to a first electrode 23 (described later) of the display unit with a touch detection function 10 and supplies a second drive signal Vcom to a second drive electrode COML based on the control signal supplied from the control unit 11.

The touch panel 30 operates based on a basic principle of capacitance touch detection, and performs a touch detection operation using a mutual capacitance method or a self-capacitance method to detect contact or proximity of an external object with a display area. The touch panel 30 can also perform a force detection operation based on a detection principle of the self-capacitance method.

The detecting unit 40 is a circuit that detects whether the touch panel 30 is touched, based on the control signals supplied from the control unit 11 and on first detection signals Vdet1 and second detection signals Vdet2 supplied from the touch panel 30. When the touch panel 30 is touched, the detecting unit 40 obtains, for example, coordinates of the touch input. The detecting unit 40 includes a detection signal amplifying unit 42, an analog-to-digital (A/D) converting unit 43, a signal processing unit 44, and a coordinate extracting unit 45. A detection timing control unit 46 controls the A/D converting unit 43, the signal processing unit 44, and the coordinate extracting unit 45 so as to operate them in synchronization with one another, based on the control signals supplied from the control unit 11.

The detecting unit 40 can also detect force applied to the display unit with a touch detection function 10 based on the second detection signals Vdet2 supplied from the first electrodes 23. The detecting unit 40 further includes a second electrode driver 48. The second electrode driver 48 is a circuit that supplies third drive signals Vt to third electrodes TDL, which will be described later.

Figure 2:
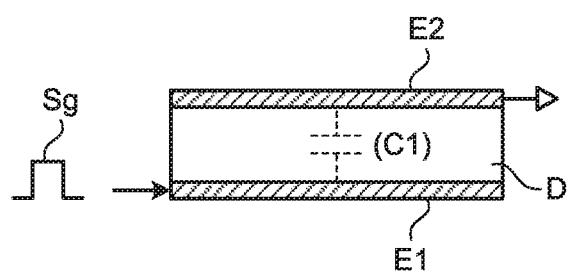
FIG. 2 is a diagram for explaining a basic principle of mutual capacitance touch detection and illustrates a state where a finger is neither in contact with nor in proximity to a detection electrode.
Figure 3:
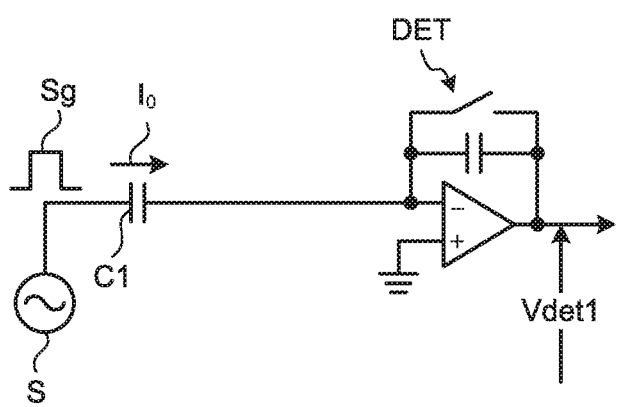
FIG. 3 is a diagram for explaining an example of an equivalent circuit in the state where a finger is neither in contact with nor in proximity to the detection electrode as illustrated in FIG. 2.
Figure 4:
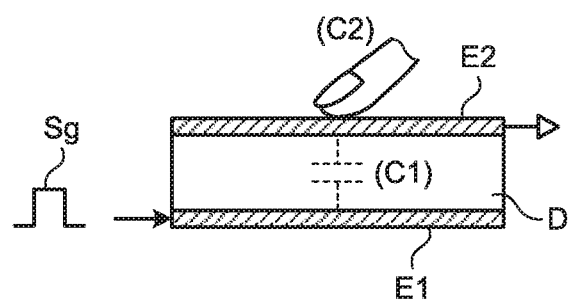
FIG. 4 is a diagram for explaining the basic principle of mutual capacitance touch detection and illustrates a state where a finger is in contact with or in proximity to the detection electrode.
Figure 5:
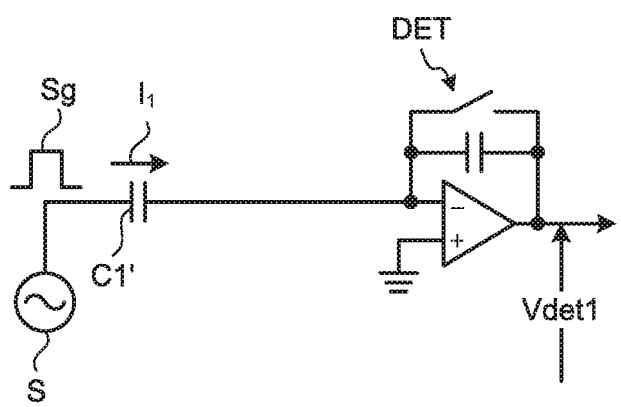
FIG. 5 is a diagram for explaining an example of the equivalent circuit in the state where a finger is in contact with or in proximity to the detection electrode as illustrated in FIG. 4.
Figure 6:
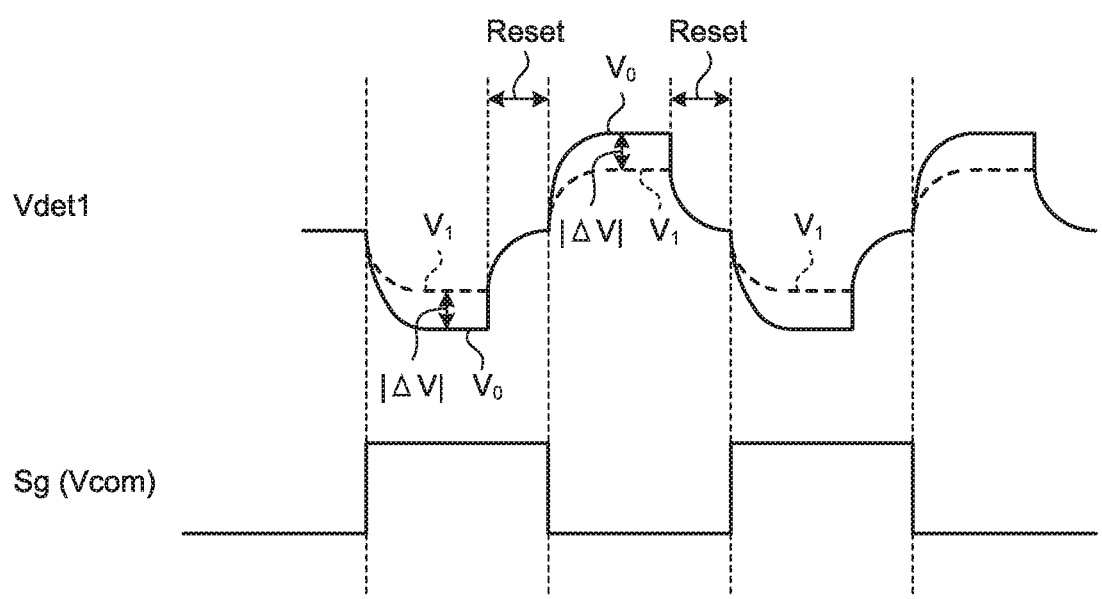
FIG. 6 is a diagram of an example of waveforms of a drive signal and a detection signal in mutual capacitance touch detection.

As described above, the touch panel 30 operates based on the basic principle of capacitance touch detection. The following describes the basic principle of mutual capacitance touch detection performed by the display device with a touch detection function 1 of the present embodiment, with reference to FIGS. 2 to 6. FIG. 2 is a diagram for explaining the basic principle of mutual capacitance touch detection and illustrates a state where a finger is neither in contact with nor in proximity to a detection electrode. FIG. 3 is a diagram for explaining an example of an equivalent circuit in the state where a finger is neither in contact with nor in proximity to the detection electrode as illustrated in FIG. 2. FIG. 4 is a diagram for explaining the basic principle of mutual capacitance touch detection and illustrates a state where a finger is in contact with or in proximity to the detection electrode. FIG. 5 is a diagram for explaining an example of the equivalent circuit in the state where a finger is in contact with or in proximity to the detection electrode as illustrated in FIG. 4. FIG. 6 is a diagram illustrating an example of waveforms of a drive signal and a detection signal. Although the following describes a case where a finger is in contact with or in proximity to the detection electrode, an object being in contact with or in proximity to the detection electrode is not limited to a finger, but, for example, an object including an external object, such as a stylus pen may be in contact with or in proximity to the detection electrode.

As illustrated in FIG. 2, for example, a capacitance element C1 includes a pair of electrodes of a drive electrode E1 and a detection electrode E2 facing each other with a dielectric D interposed therebetween. The capacitance element C1 has fringe lines of electric force extending from ends of the drive electrode E1 to the upper surface of the detection electrode E2 besides lines of electric force (not illustrated) generated between the facing surfaces of the drive electrode E1 and the detection electrode E2. As illustrated in FIG. 3, a first end of the capacitance element C1 is coupled to an alternating-current (AC) signal source (drive signal source) S, whereas a second end thereof is coupled to a voltage detector DET. The voltage detector DET is an integration circuit included in the detection signal amplifying unit 42 illustrated in FIG. 1, for example.

When the AC signal source S applies an AC rectangular wave Sg at a predetermined frequency (e.g., approximately several kilohertz to several hundred kilohertz) to the drive electrode E1 (first end of the capacitance element C1), an output waveform (first detection signal Vdet1) illustrated in FIG. 6 is generated via the voltage detector DET coupled to the detection electrode E2 (second end of the capacitance element C1). The AC rectangular wave Sg corresponds to the second drive signal Vcom received from the first electrode driver 14.

In a state where a finger is neither in contact with nor in proximity to the detection electrode (non-contact state), an electric current $I_0$ depending on the capacitance value of the capacitance element C1 flows in association with charge and discharge of the capacitance element C1 as illustrated in FIGS. 2 and 3. The voltage detector DET illustrated in FIG. 3 converts fluctuations in the electric current $I_0$ depending on the AC rectangular wave Sg into fluctuations in the voltage (waveform $V_0$ indicated by the solid line (refer to FIG. 6)).

By contrast, in a state where a finger is in contact with or in proximity to the detection electrode (contact state), capacitance C2 generated by the finger is in contact with or in proximity to the detection electrode E2 as illustrated in FIG. 4. The fringe lines of electric force between the drive electrode E1 and the detection electrode E2 are blocked by an external object (finger). As a result, the capacitance element C1 acts as a capacitance element C having a capacitance value smaller than that in the non-contact state as illustrated in FIG. 5. As illustrated in the equivalent circuit in FIG. 5, an electric current $I_1$ flows through the capacitance element Cr. As illustrated in FIG. 6, the voltage detector DET converts fluctuations in the electric current $I_1$ depending on the AC rectangular wave Sg into fluctuations in the voltage (waveform $V_1$ indicated by the dotted line). In this case, the waveform $V_1$ has amplitude smaller than that of the waveform $V_0$. An absolute value $|\Delta V|$ of voltage difference between the waveform $V_0$ and the waveform $V_1$ varies depending on an effect of an external object, such as a finger, in contact with or in proximity to the detection electrode from the outside. To accurately detect the absolute value $|\Delta V|$ of the voltage difference between the waveform $V_0$ and the waveform $V_1$, the voltage detector DET preferably operates with a period Reset for resetting charge and discharge of a capacitor by switching in the circuit in accordance with the frequency of the AC rectangular wave Sg.

The touch panel 30 illustrated in FIG. 1 sequentially scans each detection block based on the second drive signals Vcom supplied from the first electrode driver 14, thereby performing mutual capacitance touch detection.

The touch panel 30 outputs the first detection signals Vdet1 of respective detection blocks from the third electrodes TDL (described later), via the voltage detector DET illustrated in FIG. 3 or 5. The first detection signals Vdet1 are supplied to the detection signal amplifying unit 42 of the detecting unit 40.

The detection signal amplifying unit 42 amplifies the first detection signals Vdet1 supplied from the touch panel 30. The detection signal amplifying unit 42 may include an analog low-pass filter (LPF) serving as a low-pass analog filter that removes high-frequency components (noise components) included in the first detection signals Vdet1 and outputs the remaining components.

The A/D converting unit 43 samples each analog signal output from the detection signal amplifying unit 42 at a timing synchronized with the second drive signals Vcom, thereby converting the analog signals into digital signals.

The signal processing unit 44 includes a digital filter that reduces frequency components (noise components) at other frequencies than the frequency at which the second drive signals Vcom are sampled in the output signals from the A/D converting unit 43. The signal processing unit 44 is a logic circuit that determines whether a touch is made on the touch panel 30 based on the output signals from the A/D converting unit 43. The signal processing unit 44 performs processing of extracting only the difference between the detection signals caused by a finger. The signal of difference caused by a finger corresponds to the absolute value $|\Delta V|$ of the difference between the waveform $V_0$ and the waveform $V_1$. The signal processing unit 44 may perform an arithmetic operation for averaging the absolute value $|\Delta V|$ per detection block, thereby calculating the average of the absolute value $|\Delta V|$. With this operation, the signal processing unit 44 can reduce an effect of noise. The signal processing unit 44 compares the detected signal of difference caused by a finger with a predetermined threshold voltage. If the signal of difference is lower than the threshold voltage, the signal processing unit 44 determines that an external proximate object is in the non-contact state. By contrast, if the signal of difference is equal to or higher than the threshold voltage, the signal processing unit 44 determines that an external proximate object is in the contact state. As described above, the detecting unit 40 can perform touch detection.

The coordinate extracting unit 45 is a logic circuit that derives, when a touch is detected by the signal processing unit 44, the touch panel coordinates of the touch. The coordinate extracting unit 45 outputs the touch panel coordinates as output signals Vout. As described above, the display device with a touch detection function 1 according to the present embodiment can derive touch panel coordinates of a position where an external object, such as a finger, is in contact with or in proximity to it based on the basic principle of mutual capacitance touch detection.

Figure 7:
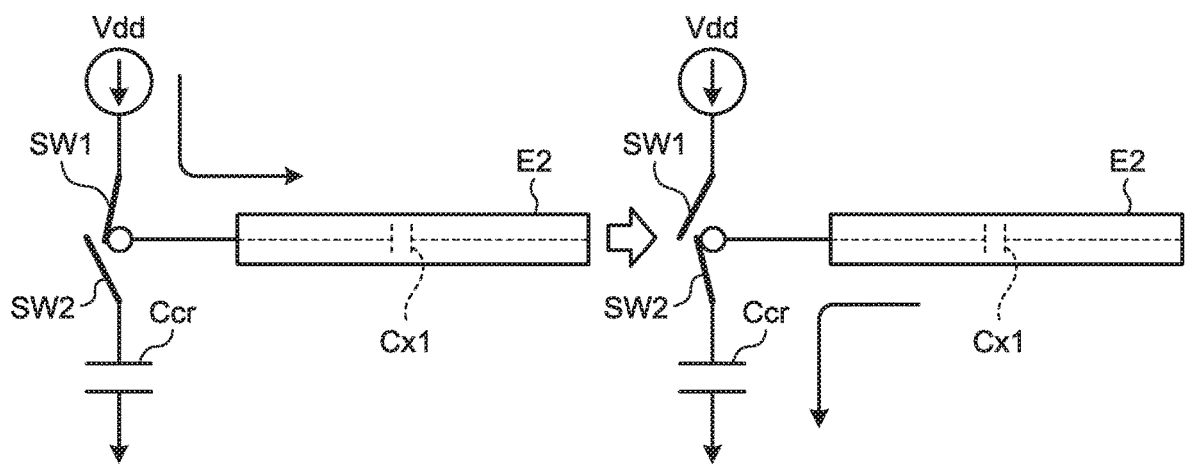
FIG. 7 is a diagram for explaining a basic principle of self-capacitance touch detection and illustrates a state where a finger is neither in contact with nor in proximity to a detection electrode.
Figure 8:
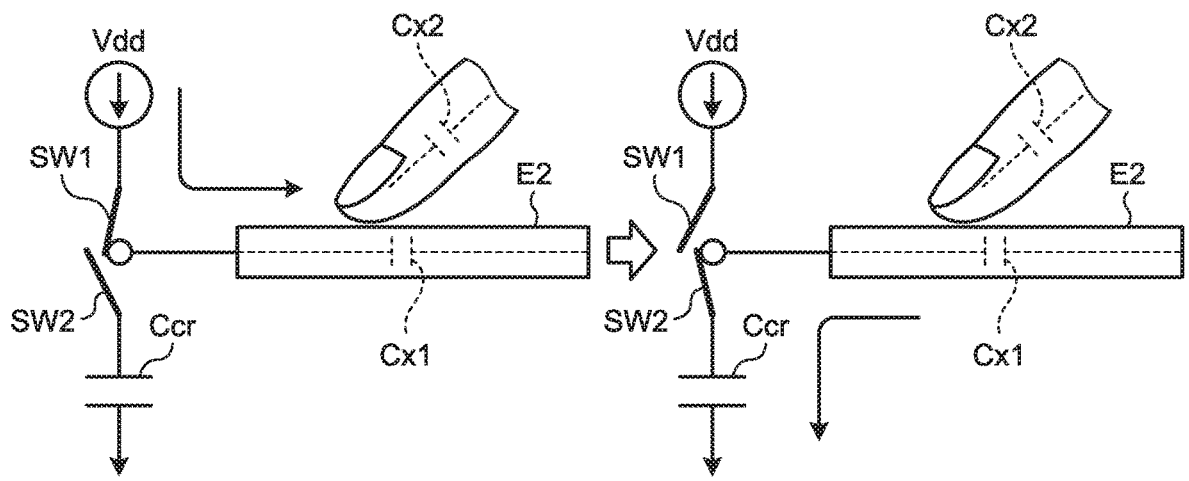
FIG. 8 is a diagram for explaining the basic principle of self-capacitance touch detection and illustrates a state where a finger is in contact with or in proximity to the detection electrode.
Figure 9:
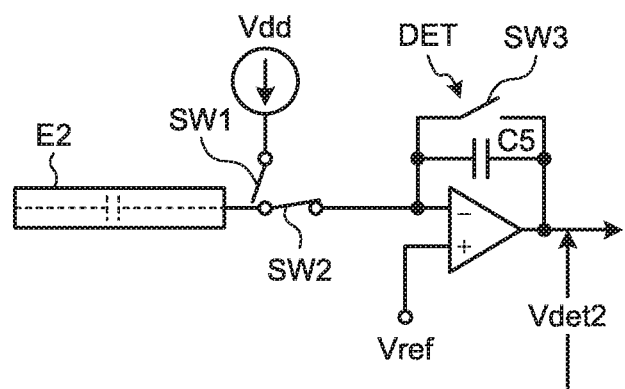
FIG. 9 is a diagram for explaining an example of an equivalent circuit in self-capacitance touch detection.
Figure 10:
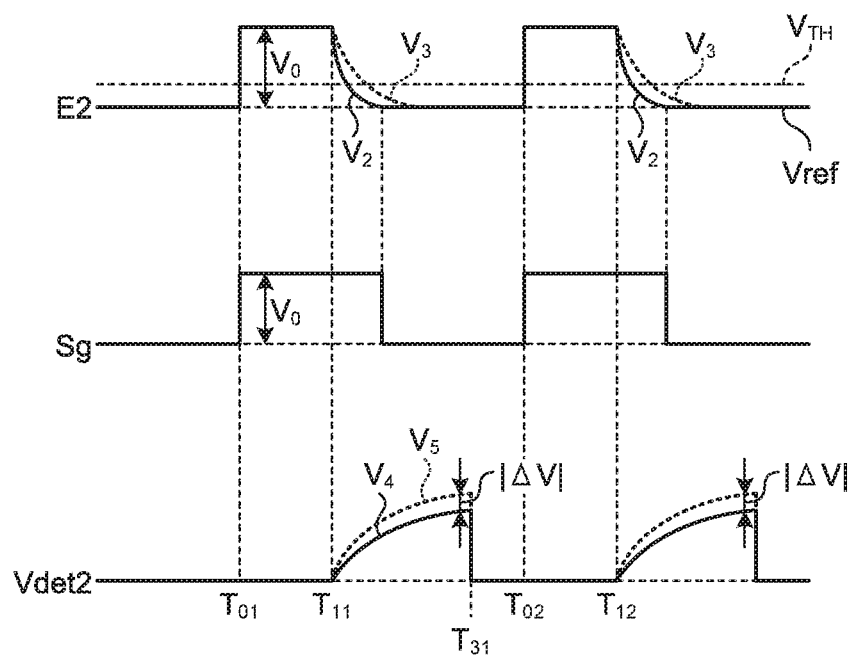
FIG. 10 is a diagram of an example of waveforms of a drive signal and a detection signal in self-capacitance touch detection.

The following describes a basic principle of self-capacitance touch detection with reference to FIGS. 7 to 10. FIG. 7 is a diagram for explaining the basic principle of self-capacitance touch detection and illustrates a state where a finger is neither in contact with nor in proximity to a detection electrode. FIG. 8 is a diagram for explaining the basic principle of self-capacitance touch detection and illustrates a state where a finger is in contact with or in proximity to the detection electrode. FIG. 9 is a diagram for explaining an example of an equivalent circuit in self-capacitance touch detection. FIG. 10 is a diagram of an example of waveforms of a drive signal and a detection signal in self-capacitance touch detection.

The left figure in FIG. 7 illustrates a state where a finger is neither in contact with nor in proximity to the detection electrode and where the detection electrode E2 is coupled to a power source Vdd by a switch SW1 and is not coupled to a capacitor Ccr by a switch SW2. In this state, capacitance Cx1 in the detection electrode E2 is charged. The right figure in FIG. 7 illustrates a state where coupling between the power source Vdd and the detection electrode E2 is turned off by the switch SW1 and where the detection electrode E2 is coupled to the capacitor Ccr by the switch SW2. In this state, an electric charge of the capacitance Cx1 is discharged via the capacitor Ccr.

The left figure in FIG. 8 illustrates a state where a finger is in contact with or in proximity to the detection electrode and where the detection electrode E2 is coupled to the power source Vdd by the switch SW1 and is not coupled to the capacitor Ccr by the switch SW2. In this state, capacitance Cx2 generated by the finger in proximity to the detection electrode E2 is also charged besides the capacitance Cx1 in the detection electrode E2. The right figure in FIG. 8 illustrates a state where coupling between the power source Vdd and the detection electrode E2 is turned off by the switch SW1 and where the detection electrode E2 is coupled to the capacitor Ccr by the switch SW2. In this state, an electric charge of the capacitance Cx1 and an electric charge of the capacitance Cx2 are discharged via the capacitor Ccr.

Because of the presence of the capacitance Cx2, the voltage change characteristics of the capacitor Ccr in discharging (the state where a finger is in contact with or in proximity to the detection electrode) illustrated in the right figure in FIG. 8 are obviously different from those of the capacitor Ccr in discharging (the state where a finger is neither in contact with nor in proximity to the detection electrode) illustrated in the right figure in FIG. 7. In the self-capacitance method, it is determined whether an input operation is performed by a finger or the like using the fact that the voltage change characteristics of the capacitor Ccr vary depending on the presence of the capacitance Cx2.

Specifically, an AC rectangular wave Sg (refer to FIG. 10) at a predetermined frequency (e.g., approximately several kilohertz to several hundred kilohertz) is applied to the detection electrode E2. The voltage detector DET illustrated in FIG. 9 converts fluctuations in the electric current depending on the AC rectangular wave Sg into fluctuations in the voltage (waveforms $V_4$ and $V_5$).

As described above, the detection electrode E2 can be cut off by the switch SW1 and the switch SW2. As illustrated in FIG. 10, the AC rectangular wave Sg raises the voltage level by an amount corresponding to voltage $V_0$ at time $T_{01}$. At this time, the switch SW1 is turned on, and the switch SW2 is turned off. As a result, the voltage level in the detection electrode E2 is also raised by voltage $V_0$. Subsequently, the switch SW1 is turned off before time $T_{11}$. While the detection electrode E2 is in a floating state at this time, the electric potential of the detection electrode E2 is maintained at $V_0$ by the capacitance Cx1 (refer to FIG. 7) of the detection electrode E2 or capacitance (Cx1+Cx2, refer to FIG. 8) obtained by adding the capacitance Cx2 generated by a finger or the like in contact with or in proximity to the detection electrode E2 to the capacitance Cx1 of the detection electrode E2. Subsequently, a switch SW3 is turned on before time $T_{11}$ and is turned off after a predetermined time has elapsed, thereby resetting the voltage detector DET. With this reset operation, the output voltage is made substantially equal to reference voltage Vref.

Subsequently, when the switch SW2 is turned on at time $T_{11}$, the voltage in an inversion input unit of the voltage detector DET becomes the voltage $V_0$ equal to that of the detection electrode E2. Subsequently, the voltage in the inversion input unit of the voltage detector DET is decreased to the reference voltage Vref based on a time constant of capacitance C5 in the voltage detector DET and the capacitance Cx1 (or Cx1+Cx2) of the detection electrode E2. Because the electric charge accumulated in the capacitance Cx1 (or Cx1+Cx2) of the detection electrode E2 moves to the capacitance C5 in the voltage detector DET, output from the voltage detector DET is increased (Vdet2). When a finger or the like is not in proximity to the detection electrode E2, the output (Vdet2) from the voltage detector DET is represented by a waveform V4 indicated by the solid line, and Vdet2=Cx1×$V_0$/C5 is satisfied. When capacitance generated by an effect of a finger or the like is added, the output is represented by a waveform V5 indicated by the dotted line, and Vdet2=(Cx1+Cx2)×$V_0$/C5 is satisfied.

Subsequently, at time $T_{31}$ after the electric charge in the capacitance Cx1 (or Cx1+Cx2) of the detection electrode E2 has already moved to the capacitance C5, the switch SW2 is turned off, and the switch SW1 and the switch SW3 are turned on. With this operation, the electric potential of the detection electrode E2 is reduced to a low level equal to that of the AC rectangular wave Sg, and the voltage detector DET is reset. The timing to turn on the switch SW1 may be any timing as long as it is after the turning off of the switch SW2 and before time $T_{02}$. The timing to reset the voltage detector DET may be any timing as long as it is after the turning off of the switch SW2 and before time $T_{12}$. The operation described above is repeatedly performed at a predetermined frequency (e.g., approximately several kilohertz to several hundred kilohertz). As a result, it can be determined whether an external proximate object is present (whether a touch is made) based on the absolute value |ΔV| of the difference between the waveform $V_4$ and the waveform $V_5$. As illustrated in FIG. 10, when a finger or the like is not in proximity to the detection electrode, the electric potential of the detection electrode E2 is represented by a waveform $V_2$. By contrast, when the capacitance Cx2 generated by an effect of a finger or the like is added, the electric potential is represented by a waveform $V_3$. In a detection method, it may be determined whether an external proximate object is present (whether a touch is made) by measuring a time until when the waveforms $V_2$ and $V_3$ decrease to predetermined voltage $V_{th}$, for example.

The explanation has been made of detection of an external proximate object in a case where a finger is in contact with or in proximity to the detection electrode with reference to FIGS. 7 to 10. The display device with a touch detection function 1 may include a conductor facing the detection electrode E2 to detect force applied to an input surface based on the detection principle of the self-capacitance method. In this case, the distance between the detection electrode E2 and the conductor varies depending on the force applied to the input surface of the display unit with a touch detection function 10, thereby changing the capacitance formed between the detection electrode E2 and the conductor. The touch panel 30 outputs the second detection signals Vdet2 based on the change in the capacitance to the detection signal amplifying unit 42. The detection signal amplifying unit 42, the A/D converting unit 43, and the signal processing unit 44 perform the signal processing described above, thereby calculating the absolute value |ΔV| of the difference between the waveform $V_4$ and the waveform $V_5$. Based on the absolute value |ΔV|, the distance between the detection electrode E2 and the conductor is calculated. With this operation, the force applied to the input surface is calculated. The coordinate extracting unit 45 may calculate the force at the input position based on distribution of the force applied to the input surface and on the touch panel coordinates derived in touch detection and output the information on the force as the output signals.

Figure 11:
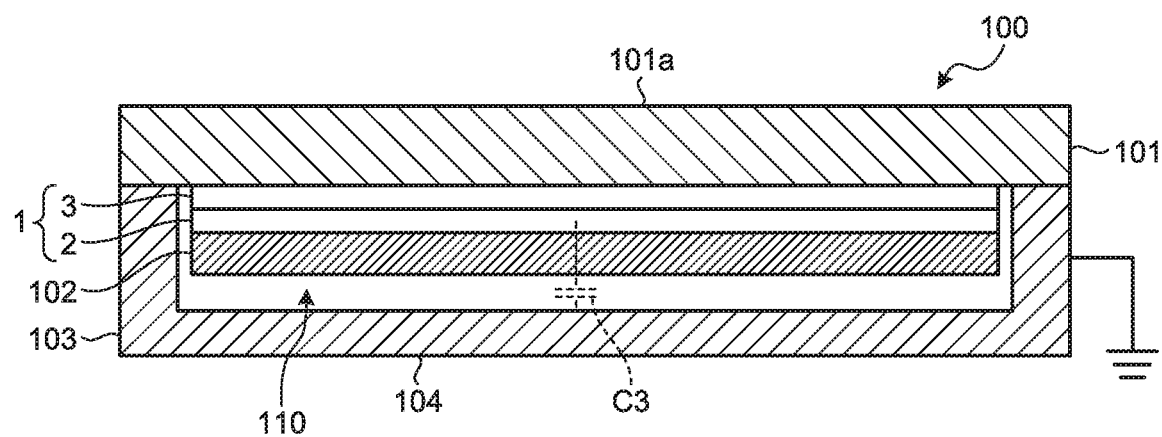
FIG. 11 is a sectional view of a schematic sectional structure of a display device including the display device with a touch detection function and a housing.

FIG. 11 is a sectional view of a schematic sectional structure of a display device including the display device with a touch detection function and a housing. A display device 100 includes a cover member 101, the display device with a touch detection function 1, a backlight 102, and a housing 103. The cover member 101 is a protective member that protects the display device with a touch detection function 1. The cover member 101 may be a translucent glass substrate or a film-like base member made of a resin material, for example. A first surface of the cover member 101 serves as an input surface 101a with or to which a finger or the like is in contact or in proximity to perform an input operation. The display device with a touch detection function 1 includes a pixel substrate 2, a counter substrate 3, and a liquid crystal layer interposed therebetween (described later). The counter substrate 3 is provided above the pixel substrate 2. The counter substrate 3 is arranged on a second surface of the cover member 101, that is, the surface opposite to the input surface 101a.

The backlight 102 is provided on the opposite side of the cover member 101 with respect to the display device with a touch detection function 1. The backlight 102 may be bonded to the lower surface of the pixel substrate 2 or arranged with a predetermined gap interposed between the pixel substrate 2 and the backlight 102. The backlight 102 includes a light source, such as a light emitting diode (LED), and emits light from the light source to the pixel substrate 2. The light passes through the display device with a touch detection function 1. More specifically, the light passes through the pixel substrate 2, the liquid crystal layer, and the counter substrate 3 and is modulated in the transmission process depending on the state of the liquid crystal layer at the transmission position. The modulated light forms a display image, and the display image transmits through the input surface 101a of the cover member 101 and is viewed by an observer. The backlight 102 may be a publicly known illumination unit and have various types of configurations. In a case where the display panel 20 of the display device with a touch detection function 1 is a reflective liquid crystal display device, the backlight 102 is not necessarily provided. The reflective liquid crystal display device includes reflective electrodes in the pixel substrate 2. In this case, light entering from the cover member 101 side is reflected by the reflective electrodes, passes through the cover member 101, and reaches the eyes of the observer. The reflective liquid crystal display device may include a front light instead of the backlight 102.

The housing 103 is a box-like member having an opening at its upper part, and the cover member 101 is provided so as to cover the opening of the housing 103. The display device with a touch detection function 1, the backlight 102, and other components are accommodated in the internal space formed by the housing 103 and the cover member 101. As illustrated in FIG. 11, the display device with a touch detection function 1 and the backlight 102 are arranged on the cover member 101 side, and a space 110 is formed between the backlight 102 and the bottom of the housing 103. The housing 103 is made of an electrically conductive material, such as a metal. The bottom of the housing 103 serves as a conductor 104 facing the first electrodes 23 (not illustrated) of the display device with a touch detection function 1. The housing 103 is electrically coupled to the ground. With this configuration, capacitance C3 is generated between the first electrodes 23 (not illustrated) of the display device with a touch detection function 1 and the conductor 104.

When force is applied to the input surface 101a, the pixel substrate 2 and the counter substrate 3 are deformed in a manner slightly bent toward the bottom of the housing 103 together with the cover member 101. The deformation changes the capacitance C3. By detecting the change in the capacitance C3 based on the detection principle of the self-capacitance method, the amount of bend in the cover member 101, the display device with a touch detection function 1, and the backlight 102 can be derived. Based on the amount of bend, the force applied to the input surface 101a is detected. The "detection of force" according to the present embodiment indicates all the following cases: recognizing whether a press is applied to the input surface 101a by detecting a change in the capacitance C3, detecting how hard the input surface 101a is pressed, that is, the magnitude of force applied to the input surface 101a by detecting the magnitude of the capacitance C3, and recognizing a specific state of the input surface 101a including whether the press is performed at one position or a plurality of positions.

The space 110 between the backlight 102 and the bottom of the housing 103 may be provided with an elastic body, such as a sponge and an elastic rubber, capable of being deformed by the applied force. The material of the housing 103 is not limited to an electrically conductive material, such as a metal, and may be an insulating material, such as a resin. In this case, a metallic layer may be provided to at least the bottom of the housing 103 to serve as the conductor 104.

Figure 12:
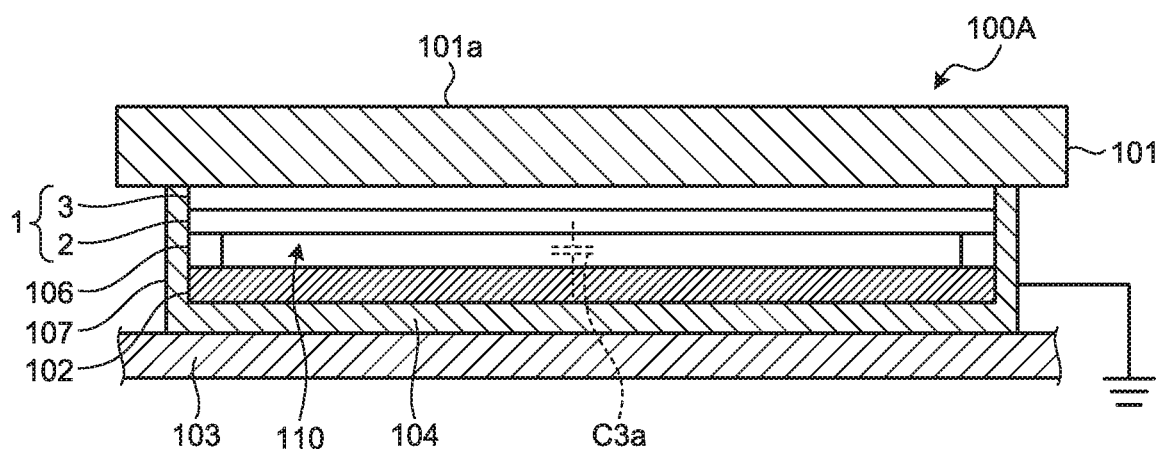
FIG. 12 is a sectional view of a schematic sectional structure of the display device according to a first modification.

FIG. 12 is a sectional view of a schematic sectional structure of the display device according to a first modification. A display device 100A according to the present modification includes a module housing 107. The cover member 101 is provided so as to cover the opening of the module housing 107. The display device with a touch detection function 1 and the backlight 102 are accommodated in the internal space formed by the module housing 107 and the cover member 101. The display device with a touch detection function 1 is provided on the surface of the cover member 101 opposite to the input surface 101a. The backlight 102 is provided on the bottom of the module housing 107. A spacer 106 is provided between the display device with a touch detection function 1 and the backlight 102 to form the space 110 between the display device with a touch detection function 1 and the backlight 102. The module housing 107 is fixed to the housing 103 of the display device 100A, whereby the display device with a touch detection function 1 and the backlight 102 are integrated with the display device 100A.

The module housing 107 according to the present modification is made of an electrically conductive material, such as a metal. With this structure, the bottom of the module housing 107 serves as the conductor 104. The module housing 107 is electrically coupled to the ground. This configuration generates capacitance C3a between the conductor 104 and the first electrodes 23 (not illustrated) of the display device with a touch detection function 1. The display device with a touch detection function 1 detects a change in the capacitance C3a based on the detection principle of the self-capacitance method, thereby detecting force applied to the input surface 101a.

The configuration of the present modification is not limited to the configuration described above. The module housing 107 may be made of an insulating material, such as a resin material, and a metallic layer may be provided to at least the bottom of the module housing 107 to serve as the conductor 104. The metallic layer may be provided to the lower surface (surface facing the bottom of the module housing 107) of the backlight 102. While the module housing 107 is fixed on the housing 103, the fixing structure is not limited thereto. The cover member 101, for example, may be fixed to the housing 103.

Figure 13:
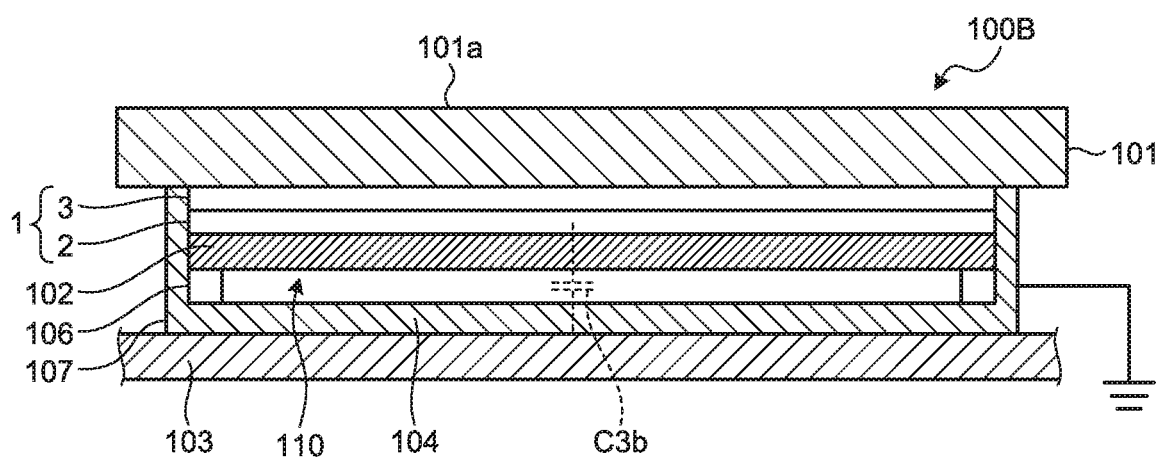
FIG. 13 is a sectional view of a schematic sectional structure of the display device according to a second modification.

FIG. 13 is a sectional view of a schematic sectional structure of the display device according to a second modification. In a display device 100B according to the present modification, the display device with a touch detection function 1 and the backlight 102 are accommodated in the internal space formed by the module housing 107 and the cover member 101. The display device with a touch detection function 1 is provided on the surface of the cover member 101 opposite to the input surface 101a. The backlight 102 is provided on the opposite side of the cover member 101 with respect to the display device with a touch detection function 1. The spacer 106 is provided between the backlight 102 and the module housing 107 to form the space 110 therebetween.

Also in the present modification, the bottom of the module housing 107 serves as the conductor 104. This configuration generates capacitance C3b between the conductor 104 and the first electrodes 23 (not illustrated) of the display device with a touch detection function 1. The display device with a touch detection function 1 detects a change in the capacitance C3b based on the detection principle of the self-capacitance method, thereby detecting force applied to the input surface 101a.

Figure 14:
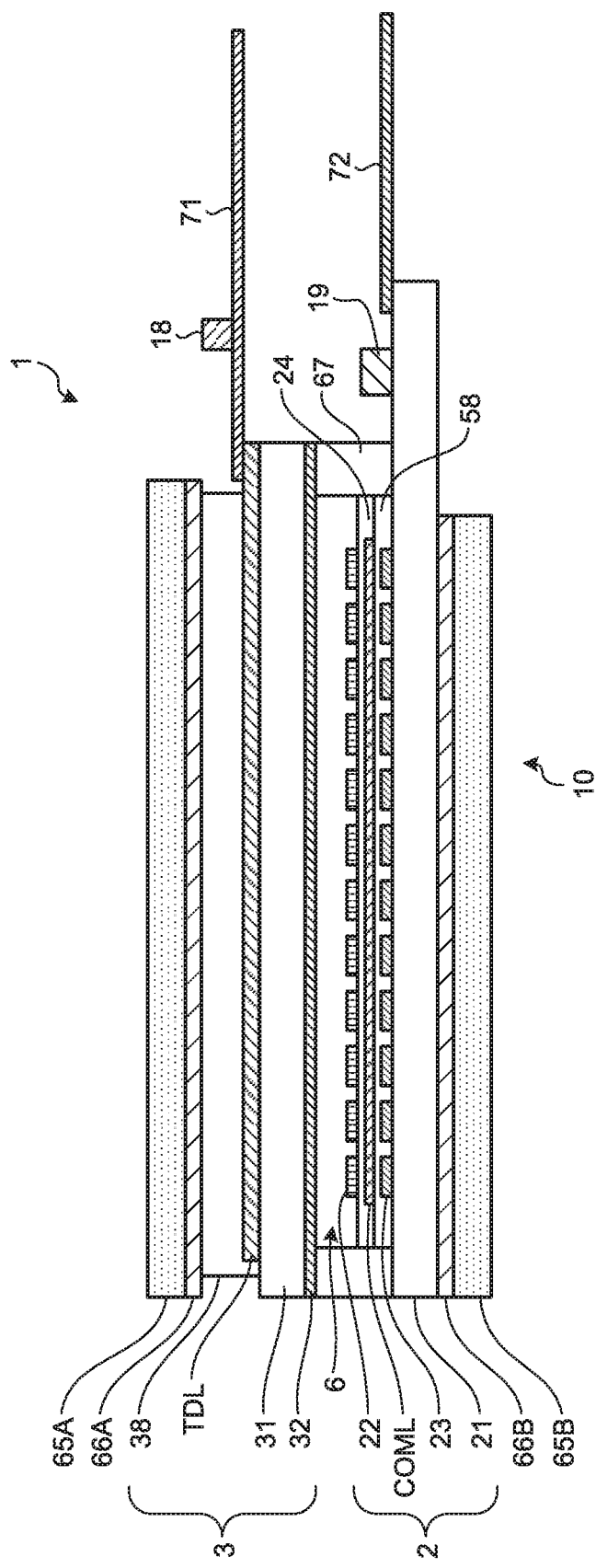
FIG. 14 is a sectional view of a schematic sectional structure of the display device with a touch detection function according to the first embodiment.
Figure 15:
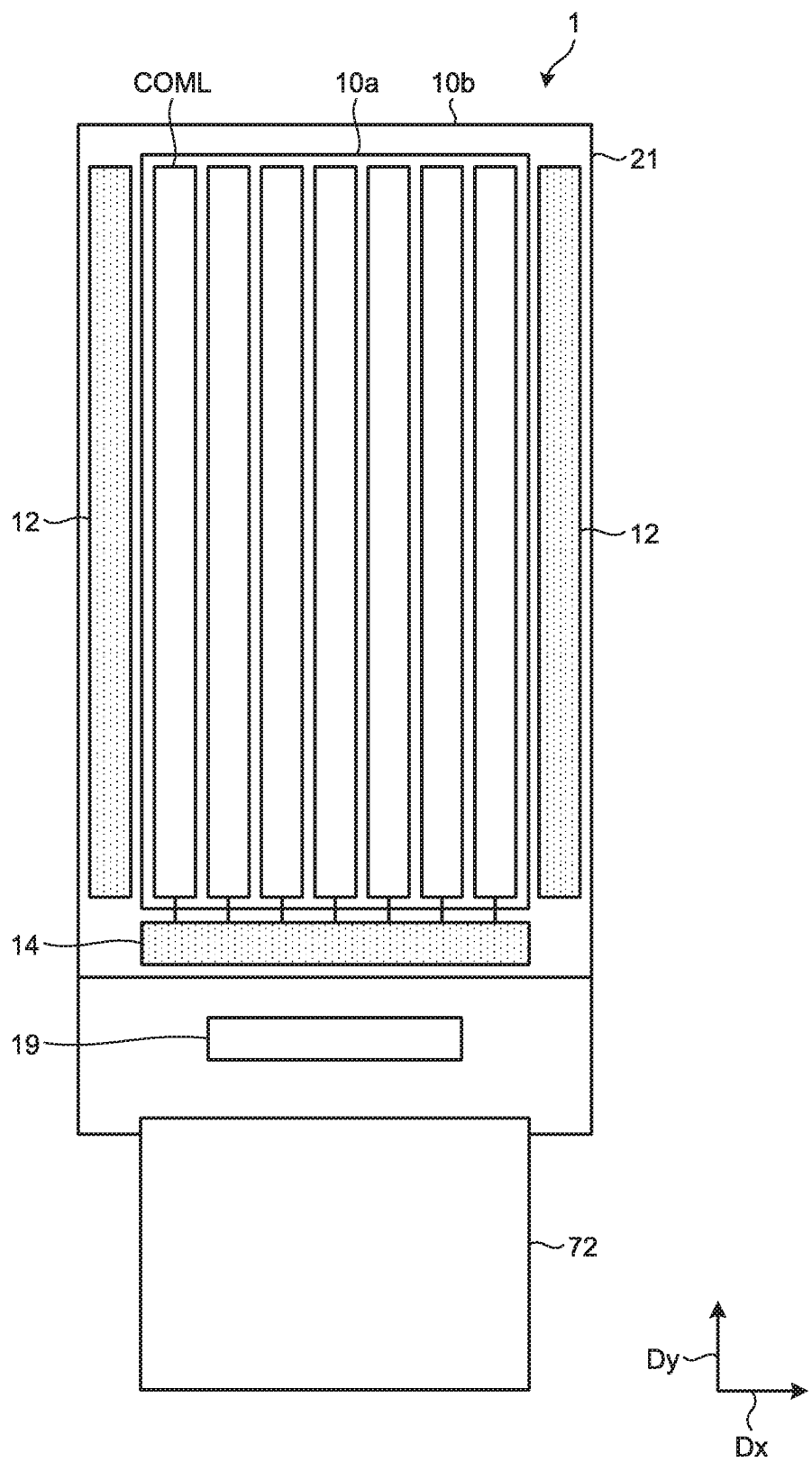
FIG. 15 is a plan view schematically illustrating a first substrate of the display device with a touch detection function.
Figure 16:
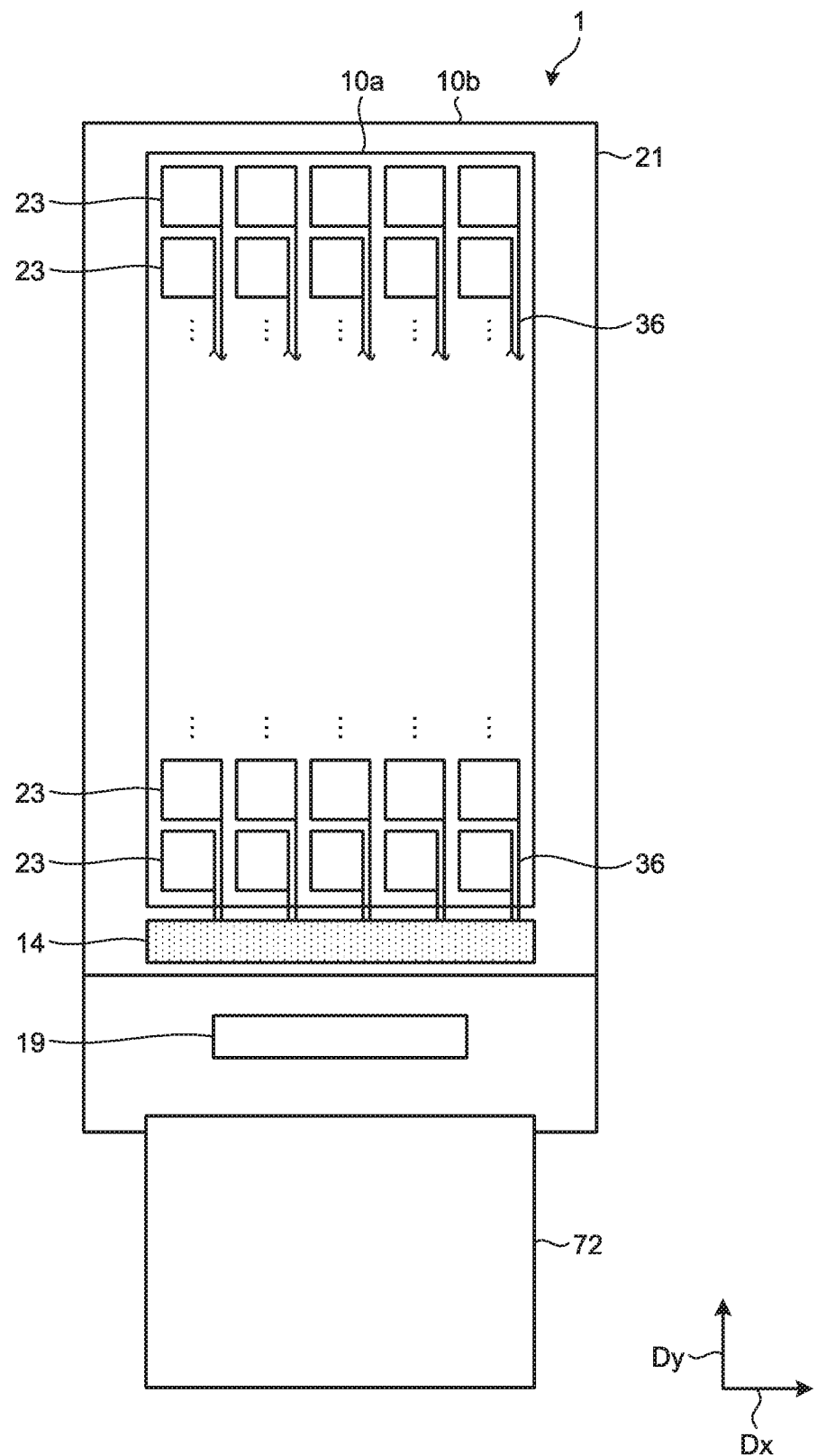
FIG. 16 is a plan view of an exemplary configuration of first electrodes.
Figure 17:
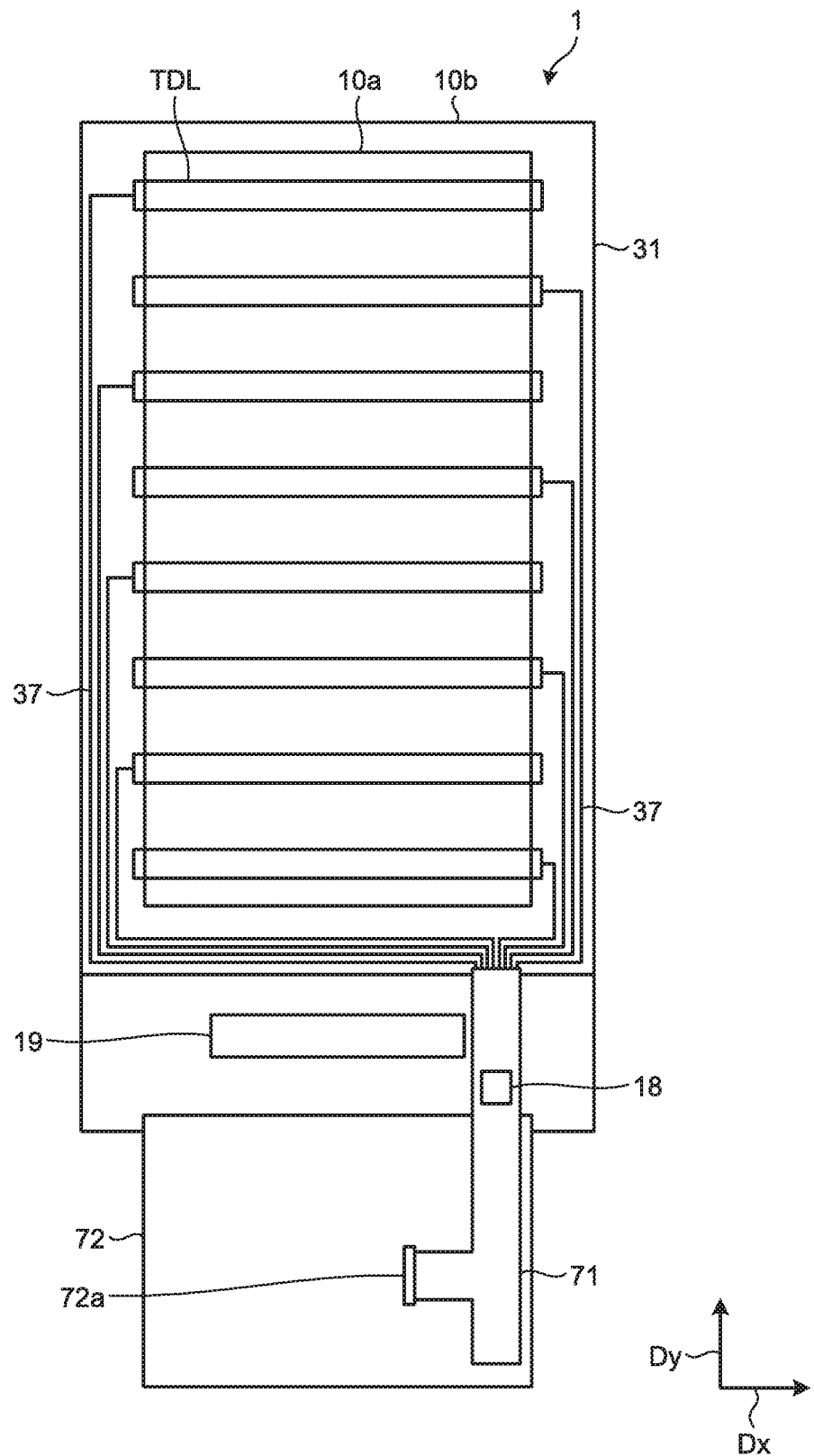
FIG. 17 is a plan view schematically illustrating a second substrate of the display device with a touch detection function.

The following describes an exemplary configuration of the display device with a touch detection function 1 in greater detail. FIG. 14 is a sectional view of a schematic sectional structure of the display device with a touch detection function according to the first embodiment. FIG. 15 is a plan view schematically illustrating a first substrate of the display device with a touch detection function. FIG. 16 is a plan view of an exemplary configuration of first electrodes. FIG. 17 is a plan view schematically illustrating a second substrate of the display device with a touch detection function.

As illustrated in FIG. 14, the display unit with a touch detection function 10 includes the pixel substrate 2, the counter substrate 3, and a liquid crystal layer 6. The counter substrate 3 is arranged facing the pixel substrate 2. The liquid crystal layer 6 is interposed between the pixel substrate 2 and the counter substrate 3 and serves as a display functional layer.

The pixel substrate 2 includes a first substrate 21 serving as a circuit board, pixel electrodes 22, first electrodes 23, and second electrodes COML. The first substrate 21 is a glass substrate or a resin substrate, for example. The first electrodes 23 are provided on the first substrate 21. The second electrodes COML are provided above the first electrodes 23 with an insulating layer 58 interposed therebetween. The pixel electrodes 22 are provided in a matrix in planar view above the second electrodes COML with an insulating layer 24 interposed therebetween. The first substrate 21 includes thin film transistors (TFT) serving as switching elements (not illustrated in FIG. 14) arranged in a manner corresponding to the pixel electrodes 22. The switching elements are provided to a layer between the first electrodes 23 and the second electrodes COML. As illustrated in FIG. 14, a polarizing plate 65B may be provided below the first substrate 21 with an adhesive layer 66B interposed therebetween. The first electrodes 23 according to the present embodiment serve as detection electrodes for force detection. The second electrodes COML may have both of the functions of drive electrodes and detection electrodes for touch detection of the touch panel 30.

The first substrate 21 is provided with a display control integrated circuit (IC) 19. The display control IC 19 is a chip mounted on the first substrate 21 by the chip-on-glass (COG) technology and includes the control unit 11. A flexible substrate 72 is coupled to an end of the first substrate 21. The display control IC 19 outputs control signals to gate lines GCL, data lines SGL, and other lines, which will be described later, based on the video signals Vdisp (refer to FIG. 1) supplied from an external host IC (not illustrated).

The counter substrate 3 includes a second substrate 31, a color filter 32, and third electrodes TDL. The color filter 32 is provided on a first surface of the second substrate 31. The third electrodes TDL are provided on a second surface of the second substrate 31. The second substrate 31 is a glass substrate or a resin substrate, for example. The third electrodes TDL serves as detection electrodes of the touch panel 30. A protective layer 38 is provided on the third electrodes TDL. A polarizing plate 65A is provided above the third electrodes TDL with an adhesive layer 66A interposed therebetween. A flexible substrate 71 is coupled to the second substrate 31. The flexible substrate 71 is coupled to the third electrodes TDL via frame wire (described later). A touch detection IC 18 mounted on the flexible substrate 71 is provided with the detecting unit 40 illustrated in FIG. 1. The first detection signals Vdet1 output from the third electrodes TDL are supplied to the touch detection IC 18 via the flexible substrate 71. The color filter 32 may be arranged on the first substrate 21.

The first substrate 21 and the second substrate 31 are arranged facing each other with a predetermined gap formed by a sealing portion 67 interposed therebetween. The liquid crystal layer 6 is provided to the space between the first substrate 21 and the second substrate 31. The liquid crystal layer 6 modulates light passing therethrough depending on the state of an electric field. The liquid crystal layer 6, for example, includes liquid crystals in a lateral electric-field mode, such as the in-plane switching (IPS) mode including the fringe field switching (FFS) mode. An orientation film may be provided between the liquid crystal layer 6 and the pixel substrate 2 and between the liquid crystal layer 6 and the counter substrate 3 illustrated in FIG. 14.

As illustrated in FIG. 15, the display device with a touch detection function 1 has a display area 10a and a frame area 10b. The display area 10a is an area for displaying an image, and the frame area 10b is positioned on the outer side of the display area 10a. The display area 10a has a rectangular shape having two long sides and two short sides facing each other. The frame area 10b has a frame shape surrounding the four sides of the display area 10a. The direction along the short side of the display area 10a is a first direction Dx. The direction intersecting with the first direction Dx and along the long side of the display area 10a is a second direction Dy.

The second electrodes COML are provided in the display area 10a of the first substrate 21. The second electrodes COML have a strip shape extending in the second direction Dy and are arrayed in the first direction Dx. The second electrodes COML are made of a translucent conductive material, such as indium tin oxide (ITO).

The first electrode driver 14 and the display control IC 19 are arranged on the short side of the frame area 10b of the first substrate 21. The gate drivers 12 are arranged on the long sides of the frame area 10b. The flexible substrate 72 is coupled to the short side of the frame area 10b. The first electrode driver 14 and the flexible substrate 72 are arranged near an end in the extending direction of the second electrodes COML. This configuration can reduce the length of wire extending from the second electrodes COML, thereby reducing the area of the frame area 10b. While the gate drivers 12 are provided on the respective long sides of the frame area 10b facing each other in FIG. 15, one gate driver may be provided on one of the long sides.

As illustrated in FIG. 16, the first electrodes 23 are provided in the display area 10a of the first substrate 21. The first electrodes 23 are provided under the second electrodes COML. To simplify the figures, FIG. 15 does not illustrate the first electrodes 23, and FIG. 16 does not illustrate the second electrodes COML. The first electrodes 23 have a substantially rectangular shape. The first electrodes 23 are arrayed in the first direction Dx and the second direction Dy to be arranged in a matrix in the display area 10a. Coupling wires 36 are coupled to the first electrodes 23 in one-to-one correspondence. The coupling wires 36 extend between the first electrodes 23 and are coupled to the first electrode driver 14. With this configuration, the first electrodes 23 are supplied with the first drive signals Vp from the first electrode driver 14 via the coupling wire 36. The first electrode driver 14 according to the present embodiment scans the first electrodes 23 in a manner sequentially or simultaneously selecting them and supplies the first drive signals Vp to the first electrodes 23. The first electrode driver 14 also scans the second electrodes COML in a manner sequentially or simultaneously selecting them and supplies the second drive signals Vcom to the second electrodes COML. The configuration of the first electrodes 23 and the coupling wire 36 will be described later in detail.

As illustrated in FIG. 17, the third electrodes TDL are provided in the display area 10a of the second substrate 31. The third electrodes TDL have a strip shape extending in the first direction Dx and are arrayed in the second direction Dy. As illustrated in FIGS. 15 and 17, the width (length in the second direction Dy) of the third electrodes TDL is smaller than the width (length in the first direction Dx) of the second electrodes COML. The gap between the third electrodes TDL adjacent to each other in the array direction (second direction Dy) of the third electrodes TDL is larger than the gap between the second electrodes COML adjacent to each other in the first direction Dx. If the second electrodes COML are driven as the detection electrode E2 in the detection principle of the self-capacitance method, the lines of electric force generated from the second electrodes COML pass through the gaps between the third electrodes TDL. The lines of electric force reach the input surface 101a (refer to FIG. 11 and other figures), thereby detecting contact or proximity of a finger or the like.

The third electrodes TDL are made of a translucent conductive material, such as ITO. The third electrodes TDL are not limited thereto and may be metallic thin wires made of a metallic material, for example. Frame wires 37 are coupled to respective ends of the third electrodes TDL. The frame wires 37 extend along the long sides of the frame area 10b and are coupled to the flexible substrate 71 provided on the short side of the frame area 10b of the second substrate 31. The first detection signals Vdet1 output from the third electrodes TDL are supplied to the touch detection IC 18 via the frame wire 37 and the flexible substrate 71.

While the detecting unit 40 according to the present embodiment is mounted on the touch detection IC 18, part of functions of the detecting unit 40 may be provided as functions of another micro-processing unit (MPU) included in the display device (described later). Specifically, part of functions (e.g., noise reduction) out of various functions that can be provided as the functions of the touch driver IC, such as A/D conversion and noise reduction, may be performed by a circuit such as an MPU.

The flexible substrate 71 is coupled to the flexible substrate 72 via a connector 72a. The touch detection IC 18 may include part of functions of the second electrode driver 48 (refer to FIG. 1). In this case, the touch detection IC 18 may supply the third drive signals Vt to the third electrodes TDL via the flexible substrate 71.

Figure 18:
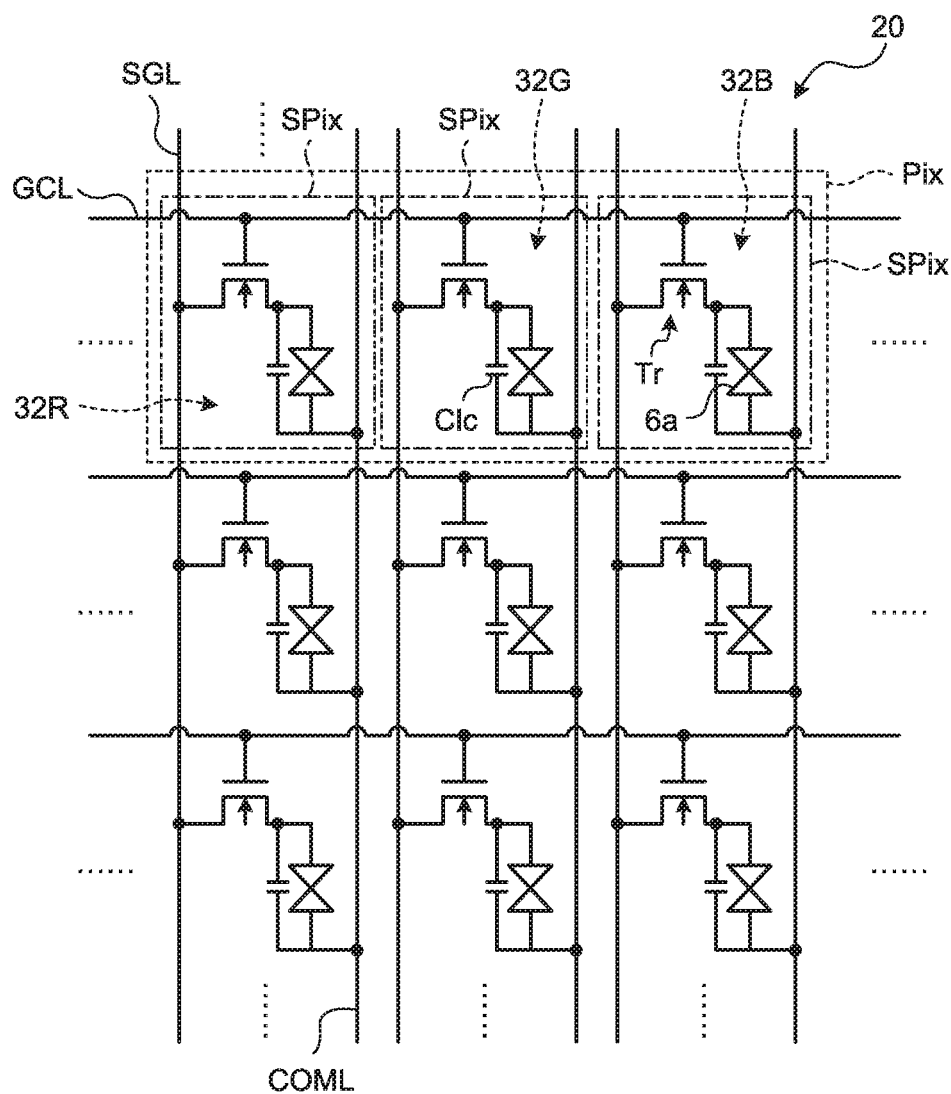
FIG. 18 is a circuit diagram of a pixel array in a display unit with a touch detection function according to the first embodiment.

The following describes a display operation performed by the display panel 20. FIG. 18 is a circuit diagram of a pixel array in the display unit with a touch detection function according to the first embodiment. The first substrate 21 (refer to FIG. 14) is provided with switching elements (hereinafter, referred to as TFT elements) Tr of respective sub-pixels SPix and wires, such as the data lines SGL and the gate lines GCL, as illustrated in FIG. 18. The data lines SGL supply the pixel signals Vpix to the respective pixel electrodes 22, and the gate lines GCL supply drive signals for driving the TFT elements Tr. The data lines SGL and the gate lines GCL extend on a plane parallel to the surface of the first substrate 21.

The display panel 20 illustrated in FIG. 18 includes a plurality of sub-pixels SPix arrayed in a matrix. The sub-pixels SPix each include the TFT element Tr and a liquid crystal element 6a. The TFT element Tr is a thin-film transistor and is an re-channel metal oxide semiconductor (MOS) TFT in this example. The source of the TFT element Tr is coupled to the data line SGL, the gate thereof is coupled to the gate line GCL, and the drain thereof is coupled to a first end of the liquid crystal element 6a. In the equivalent circuit, the first end of the liquid crystal element 6a including the liquid crystal layer 6 is coupled to the drain of the TFT element Tr, and a second end thereof is coupled to the second electrode COML. The insulating layer 24 is provided between the pixel electrodes 22 and common electrodes (second electrodes COML) to form holding capacitance Clc illustrated in FIG. 18.

The sub-pixel SPix is coupled to other sub-pixels SPix belonging to the same row in the display panel 20 by the gate line GCL. The gate line GCL is coupled to the gate driver 12 (refer to FIG. 1) and supplied with the scanning signals Vscan from the gate driver 12. The sub-pixel SPix is coupled to other sub-pixels SPix belonging to the same column in the display panel 20 by the data line SGL. The data line SGL is coupled to the source driver 13 (refer to FIG. 1) and supplied with the pixel signals Vpix from the source driver 13. The sub-pixel SPix is also coupled to the other sub-pixels SPix belonging to the same column by the second electrode COML. The second electrode COML is coupled to the first electrode driver 14 (refer to FIG. 1) and supplied with the second drive signals Vcom from the first electrode driver 14. The extending direction of the second electrodes COML according to the present embodiment is parallel to the extending direction of the data lines SGL.

The gate driver 12 illustrated in FIG. 1 drives to sequentially scan the gate lines GCL. The gate driver 12 applies the scanning signals Vscan (refer to FIG. 1) to the gates of the TFT elements Tr of the sub-pixels SPix via the gate line GCL, thereby sequentially selecting one row (one horizontal line) out of the sub-pixels SPix as a target of display drive. The source driver 13 supplies the pixel signals Vpix to the sub-pixels SPix constituting the selected one horizontal line via the data lines SGL. These sub-pixels SPix perform display of each horizontal line based on the supplied pixel signals Vpix. To perform the display operation, the first electrode driver 14 applies the second drive signals Vcom (display drive signals Vcomd) to the second electrodes COML. As a result, the second electrodes COML serve as common electrodes for the pixel electrodes 22 in the display operation.

The color filter 32 illustrated in FIG. 14 may include periodically arrayed color areas of three colors of red (R), green (G), and blue (B), for example. Color areas 32R, 32G, and 32B of the three colors of R, G, and B, respectively, serve as a set and are associated with the respective sub-pixels SPix illustrated in FIG. 18. A set of the sub-pixels SPix corresponding to the respective color areas 32R, 32G, and 32B of the three colors serves as a pixel Pix. As illustrated in FIG. 14, the color filter 32 faces the liquid crystal layer 6 in a direction perpendicular to the first substrate 21. The color filter 32 may have another combination of colors as long as they are colored with different colors. The color filter 32 is not limited to a combination of three colors and may be a combination of four colors or more.

As illustrated in FIG. 18, the second electrodes COML according to the present embodiment extend in a direction parallel to the extending direction of the data lines SGL and intersect with the gate lines GCL in planar view. With this configuration, the wire extending from the second electrodes COML can be drawn to the short side (flexible substrate 72 side) of the frame area 10b (refer to FIG. 15). As a result, the first electrode driver 14 need not be provided on the long side of the frame area 10b, thereby reducing the width of the frame area 10b compared with a case where the second electrodes COML extend in a direction orthogonal to the data lines SGL. The configuration of the second electrodes COML is not limited thereto, and they may extend in a direction parallel to the gate lines GCL, for example.

Figure 19:
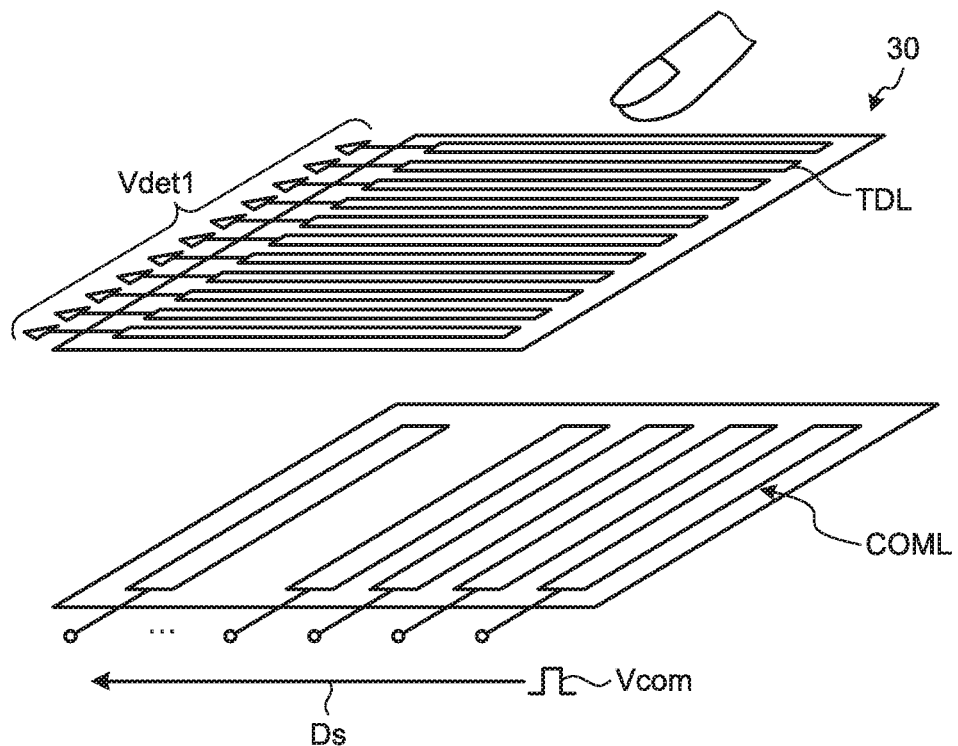
FIG. 19 is a perspective view of an exemplary configuration of second electrodes and third electrodes in the display unit with a touch detection function according to the first embodiment.

The second electrodes COML illustrated in FIGS. 14 and 15 serve not only as common electrodes facing the pixel electrodes 22 of the display panel 20 and but also as drive electrodes of the touch panel 30 to perform mutual capacitance touch detection. The second electrodes COML may also serve as detection electrodes of the touch panel 30 to perform self-capacitance touch detection. FIG. 19 is a perspective view of an exemplary configuration of the drive electrodes and the detection electrodes in the display unit with a touch detection function according to the first embodiment. The touch panel 30 includes the second electrodes COML in the pixel substrate 2 and the third electrodes TDL in the counter substrate 3.

The second electrodes COML include a plurality of stripe electrode patterns aligned in the horizontal direction in FIG. 19. The third electrodes TDL include a plurality of electrode patterns extending in a direction intersecting with the extending direction of the electrode patterns of the second electrodes COML. The third electrodes TDL face the second electrodes COML in a direction perpendicular to the surface of the first substrate 21 (refer to FIG. 14). The electrode patterns of the third electrodes TDL are coupled to respective input terminals of the detection signal amplifying unit 42 of the detecting unit 40 (refer to FIG. 1). Capacitance is generated at the intersections of the electrode patterns of the second electrodes COML and those of the third electrodes TDL.

The third electrodes TDL and the second electrodes COML do not necessarily have a shape divided into a plurality of stripe patterns. The third electrodes TDL and the second electrodes COML may have a comb shape, for example. The third electrodes TDL and the second electrodes COML simply need to be divided into a plurality of pieces. The shape of slits that divide the second electrodes COML may be a straight line or a curved line.

With this structure, to perform a mutual capacitance touch detection operation in the touch panel 30, the first electrode driver 14 sequentially scans and drives the second electrodes COML, thereby sequentially selecting the second electrodes COML in a scanning direction Ds. The third electrodes TDL output the first detection signals Vdet1, thereby performing touch detection in the third electrodes TDL. In other words, the second electrodes COML correspond to the drive electrode E1 in the basic principle of mutual capacitance touch detection, whereas the third electrodes TDL correspond to the detection electrode E2. In the touch panel 30, as illustrated in FIG. 19, the third electrodes TDL and the second electrodes COML intersect with each other and serve as a capacitance touch sensor formed in a matrix. With this configuration, the display device with a touch detection function 1 performs scanning over the entire touch detection surface of the touch panel 30, thereby detecting a position where an external object is in contact with or in proximity to the touch detection surface.

Figure 20:
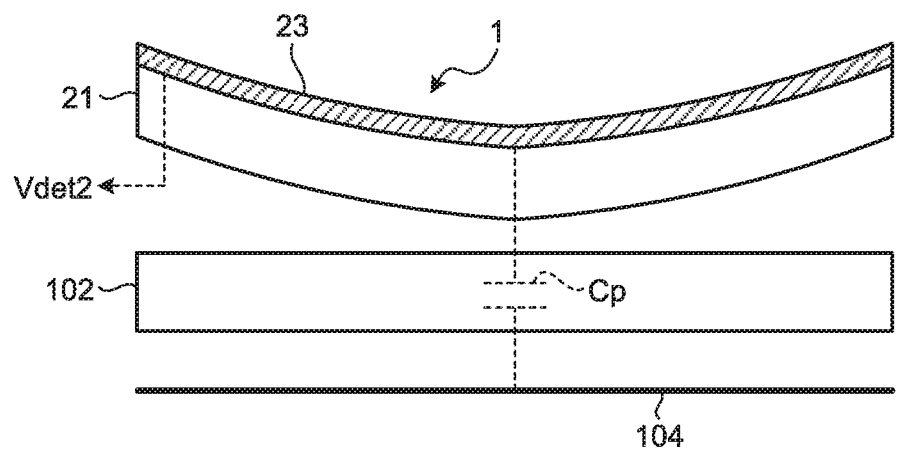
FIG. 20 is a diagram for explaining force detection performed by the display device with a touch detection function according to the first embodiment.

FIG. 20 is a diagram for explaining force detection performed by the display device with a touch detection function according to the first embodiment. The conductor 104 (e.g., the housing 103 or the module housing 107) facing the first electrodes 23 is provided. Capacitance Cp is generated between the first electrodes 23 and the conductor 104. When pressing force is applied to the input surface 101a (refer to FIG. 11 and other figures), the cover member 101 is slightly bent toward the conductor 104 depending on the pressuring force. The first substrate 21 of the display device with a touch detection function 1 is bent together with the cover member 101. The bend reduces the gap between the first electrodes 23 and the conductor 104, thereby creating an area in which the capacitance Cp increases.

Based on the detection principle of the self-capacitance method, the second detection signals Vdet2 are output from the first electrodes 23. In other words, the first electrodes 23 correspond to the detection electrode E2 in the detection principle of the self-capacitance method. Based on the second detection signals Vdet2, the magnitude of force applied to each of the first electrodes 23 can be detected. Because the first electrodes 23 are arranged in a matrix in the display area 10a, distribution of force in the display area 10a can be detected based on the second detection signals Vdet2 output from the respective first electrodes 23. The display device with a touch detection function 1 according to the present embodiment can detect the position of touch input and the magnitude of force applied at the touch input position. The display device with a touch detection function 1 can combine these detection results and reflect them on various applications.

Figure 21:
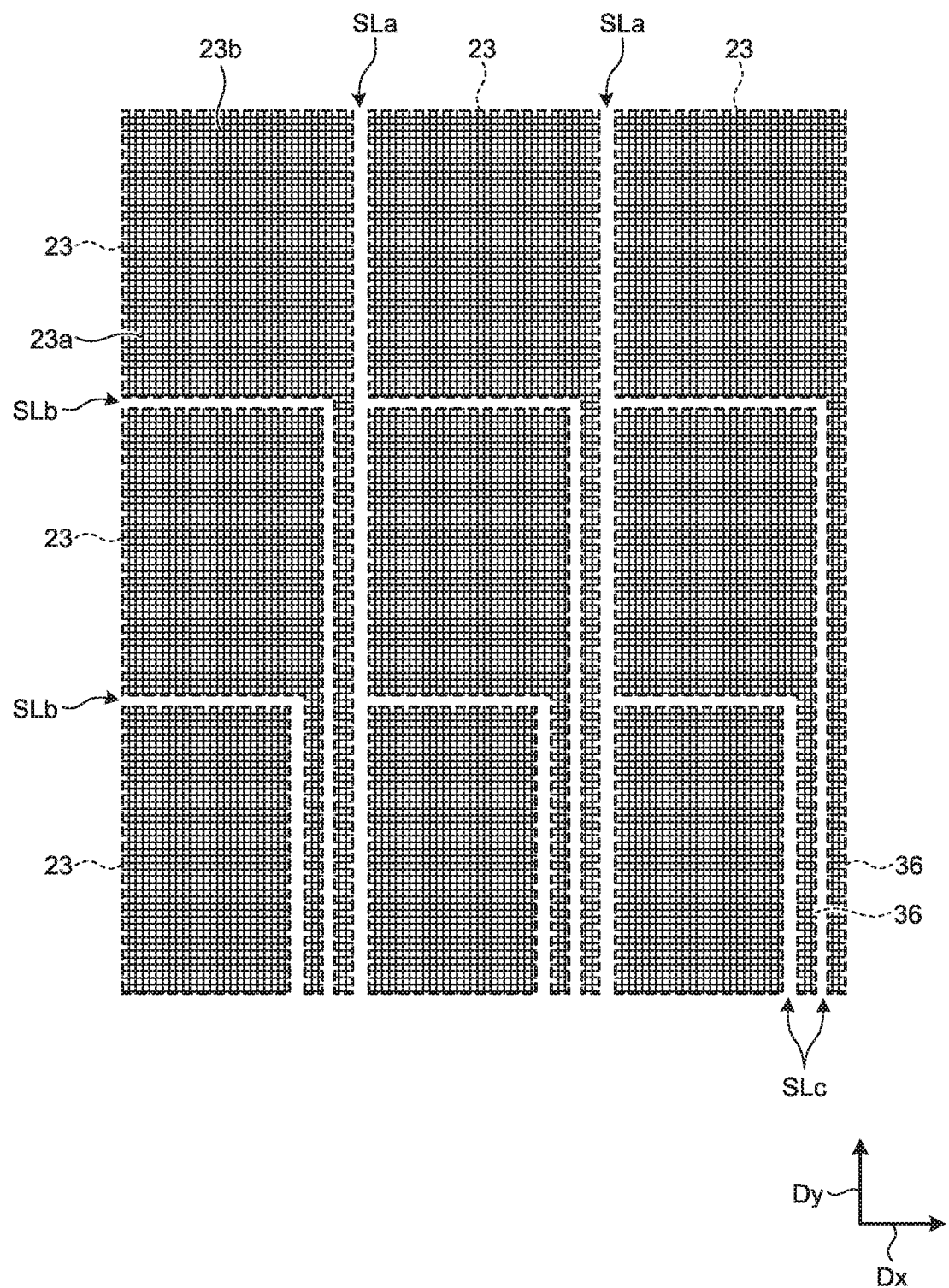
FIG. 21 is a schematic plan view illustrating the first electrodes according to the first embodiment in an enlarged manner.
Figure 22:
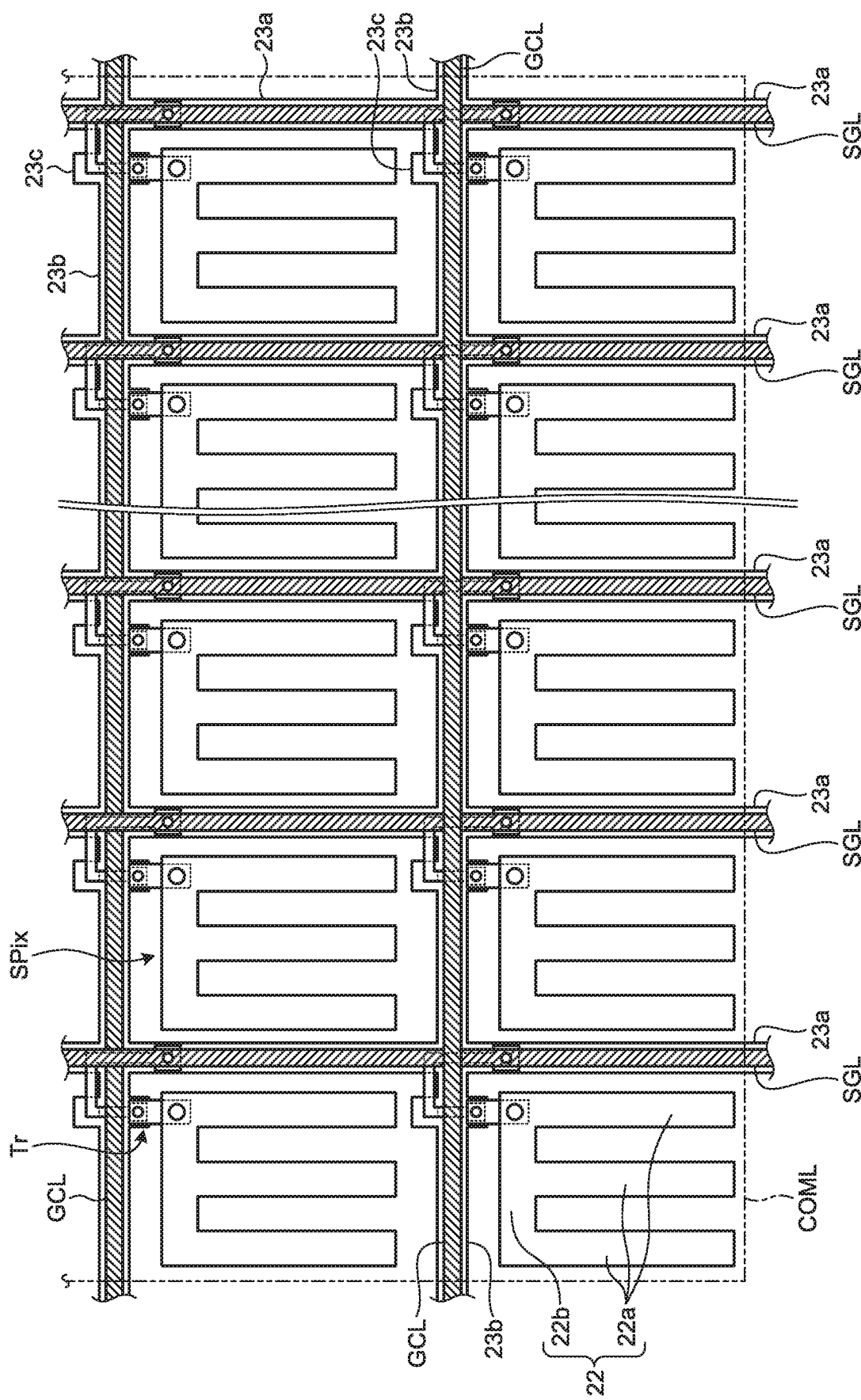
FIG. 22 is a schematic plan view of a relation in an array of the first electrodes and pixel electrodes.
Figure 23:
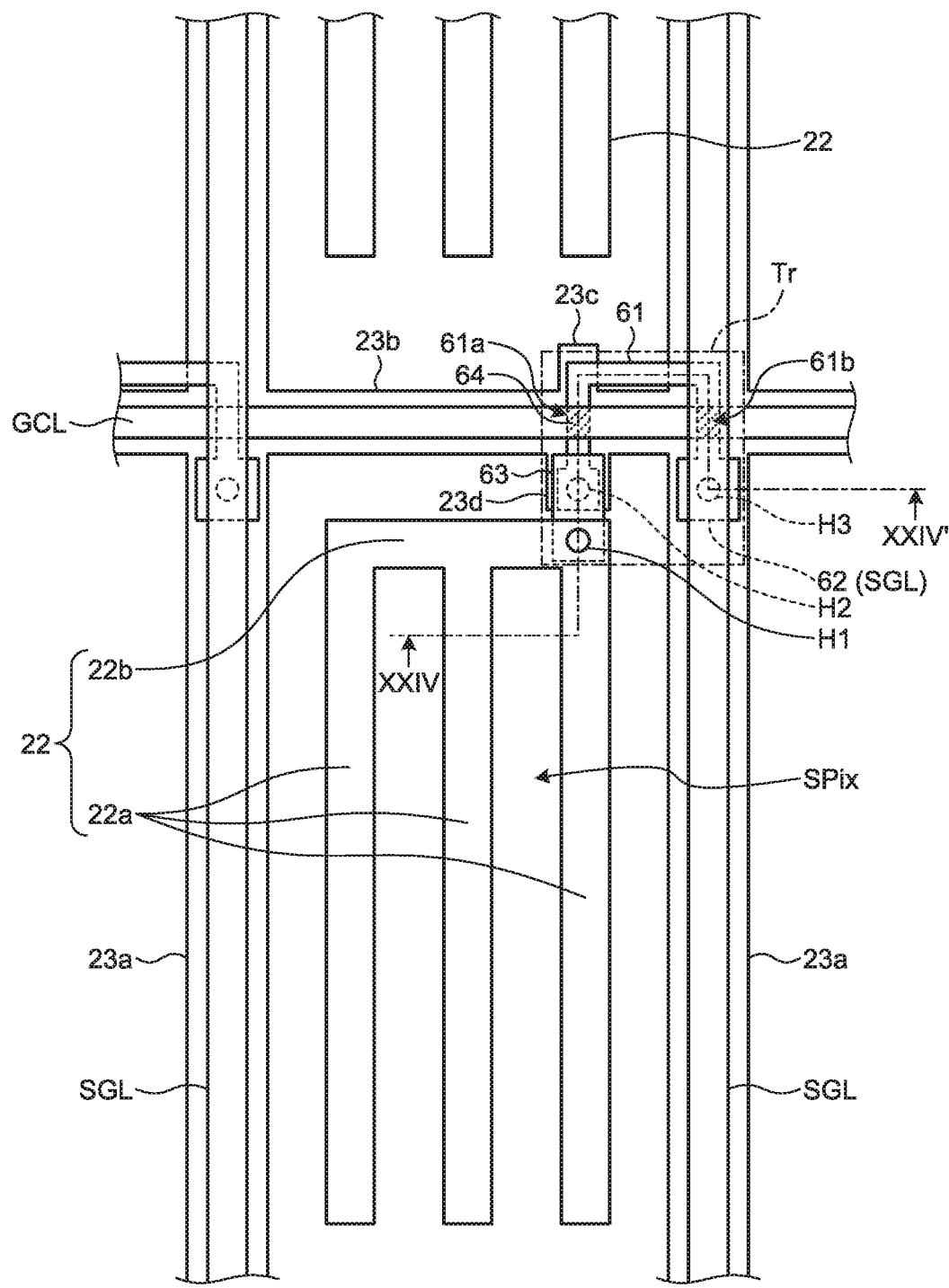
FIG. 23 is a plan view for explaining a configuration of sub-pixels.
Figure 24:
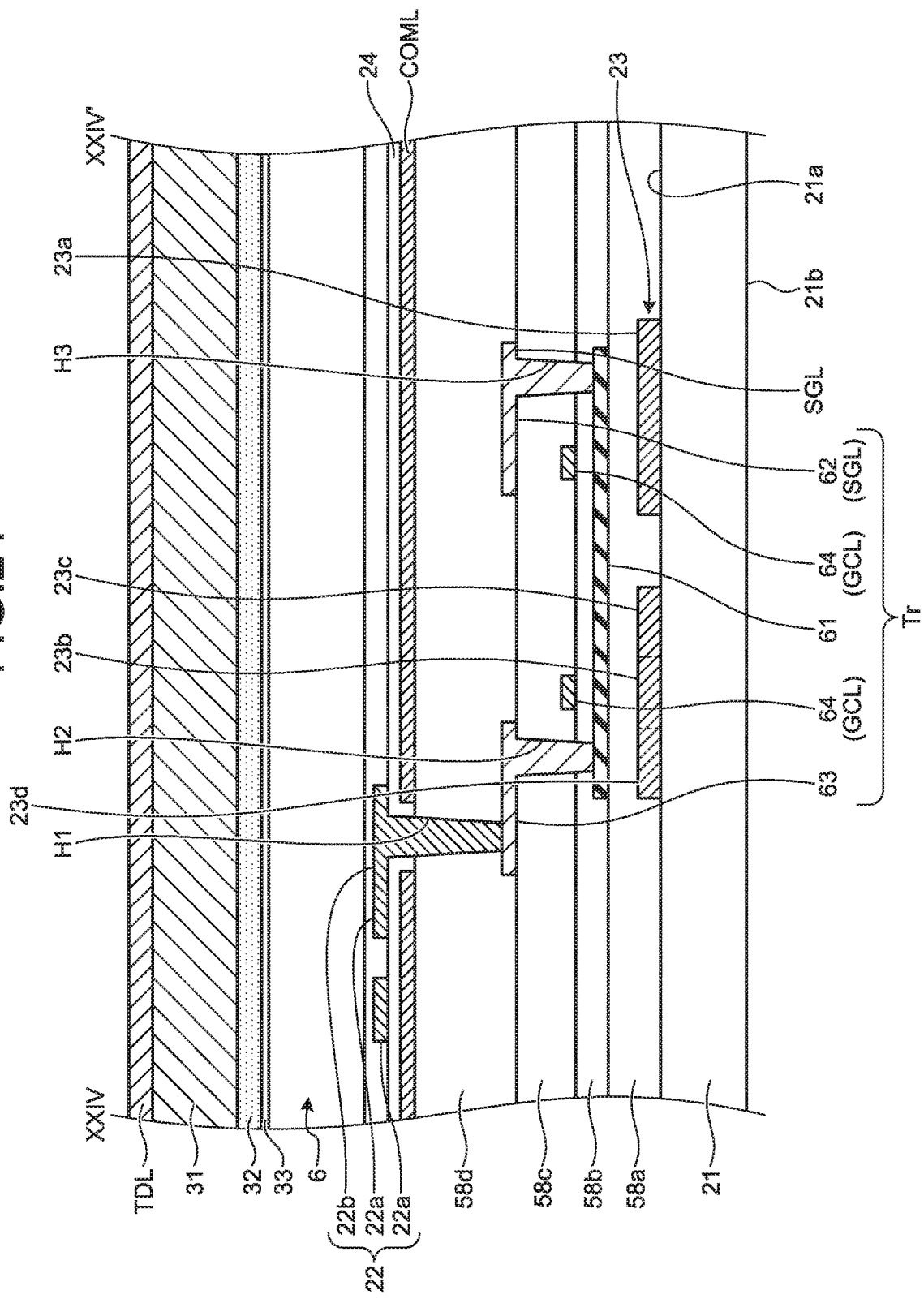
FIG. 24 is a sectional view along line XXIV-XXIV' in FIG. 23.

The following describes the configuration of the first electrodes 23 in detail. FIG. 21 is a schematic plan view illustrating the first electrodes according to the first embodiment in an enlarged manner. FIG. 22 is a schematic plan view of a relation in an array of the first electrodes and the pixel electrodes. FIG. 23 is a plan view for explaining the configuration of the sub-pixels. FIG. 24 is a sectional view along line XXIV-XXIV' in FIG. 23. As illustrated in FIG. 21, the first electrodes 23 each include a plurality of electrically conductive wires 23a and 23b. The wires 23a extend in a direction along the second direction Dy and arrayed in the first direction Dx. The wires 23b extend in a direction along the first direction Dx and arrayed in the second direction Dy. The wires 23a and 23b intersect with each other and are coupled at the intersections. With this configuration, the first electrodes 23 are formed into a mesh shape. The wire 23a is divided by slits SLb, and the wire 23b is divided by slits SLa. The wires 23b and 23a divided by the slit SLa and the slit SLb, respectively, serve as one first electrode 23.

The coupling wire 36 includes the wires 23a and 23b. The coupling wire 36 is electrically separated from another coupling wire 36 or a first electrode 23 adjacent thereto by slits SLc formed in the wire 23b. As described above, the coupling wire 36 according to the present embodiment includes the wires 23a and 23b. This configuration can reduce the difference in light transmittance between the part provided with the first electrodes 23 and the part provided with the coupling wire 36, thereby suppressing visual recognition of the patterns of the first electrodes 23. The first electrodes 23 are coupled to the first electrode driver 14 (refer to FIG. 16) via the wire 23a. The coupling wire 36 does not necessarily include the wire 23b.

The wires 23a and 23b are made of a metallic material including at least one of aluminum (Al), copper (Cu), silver (Ag), molybdenum (Mo), or an alloy of these metals. The wires 23a and 23b may be a laminated body having a plurality of layers made of one or more of these metal materials. Alternatively, the wires 23a and 23b may be made of a translucent conductive material, such as ITO. Still alternatively, the wires 23a and 23b may have a configuration in which the metallic materials described above and ITO are laminated.

As illustrated in FIG. 22, a plurality of pixel electrodes 22 are arranged in a matrix at positions overlapping with one second electrode COML. The TFT elements Tr are provided at the positions corresponding to the respective pixel electrodes 22. The gate lines GCL extend in the row direction and are arrayed in the column direction. The data lines SGL extend in the column direction intersecting with the extending direction of the gate lines GCL and are arrayed in the row direction. The TFT elements Tr are arranged at the intersections of the gate lines GCL and the data lines SGL. The area surrounded by the gate lines GCL and the data lines SGL corresponds to the sub-pixel SPix. The sub-pixel SPix includes an area in which the pixel electrode 22 overlaps with the second electrode COML.

The wire 23a according to the present embodiment is provided under the data lines SGL and extends in the same direction as the extending direction of the data lines SGL. The wire 23b is provided under the gate lines GCL and extends in the same direction as the extending direction of the gate lines GCL. The wire 23a and the wire 23b are arranged not under the pixel electrodes 22 but under the second electrode COML. The wire 23a and the wire 23b are provided consecutively across the sub-pixels SPix arrayed in a matrix. One first electrode 23 (refer to FIG. 21) including a plurality of wires 23a and 23b has a side the length of which is larger than that of the second electrode COML in the width direction. The length of the side of the first electrode 23 may be equal to or smaller than that of the second electrode COML in the width direction.

As illustrated in FIG. 23, the pixel electrode 22 has its long side along the extending direction of the data lines SGL. The pixel electrode 22 includes a plurality of strip-shaped electrodes 22a and a connection 22b. The strip-shaped electrodes 22a extend in the extending direction of the data lines SGL and are arrayed in the extending direction of the gate lines GCL. The connection 22b connects ends of the strip-shaped electrodes 22a.

As illustrated in FIGS. 23 and 24, the TFT elements Tr include a semiconductor layer 61, a source electrode 62, a drain electrode 63, and a gate electrode 64. The pixel electrode 22 is coupled to the drain electrode 63 of the TFT element Tr through a contact hole H1. The semiconductor layer 61 is coupled to the drain electrode 63 through a contact hole H2 and bent in a manner intersecting with the gate line GCL a plurality of times in planar view. The portions in the gate line GCL overlapping with the semiconductor layer 61 serve as the gate electrodes 64. The semiconductor layer 61 extends to a position under the data line SGL and is electrically coupled to the data line SGL through a contact hole H3. The portion in the data line SGL overlapping with the semiconductor layer 61 serves as the source electrode 62.

The wire 23b is provided under the gate line GCL and has light-shielding portions 23c and 23d protruding in directions intersecting with the extending direction of the wire 23b. The light-shielding portions 23c and 23d are provided at positions where the gate line GCL intersects with the semiconductor layer 61. The light-shielding portion 23c is provided under the portion of the semiconductor layer 61 extending and intersecting with the gate line GCL. The light-shielding portion 23d is provided under the coupling portion between the semiconductor layer 61 and the drain electrode 63. The wire 23a is provided under the portion of the semiconductor layer 61 provided under the data line SGL.

As illustrated in FIG. 24, the wires 23a and 23b and the light-shielding portions 23c and 23d constituting the first electrode 23 are provided on a first surface 21a of the first substrate 21. An insulating layer 58a is provided in a manner covering the wires 23a and 23b and the light-shielding portions 23c and 23d. The semiconductor layer 61 is provided on the insulating layer 58a. An insulating layer 58b is provided on the semiconductor layer 61, and the gate line GCL is provided on the insulating layer 58b. An insulating layer 58c is provided on the gate line GCL, and the drain electrode 63 and the data line SGL are provided on the insulating layer 58c. An insulating layer 58d is provided on the drain electrode 63 and the data line SGL, and the second electrode COML is provided on the insulating layer 58d. As described above, the insulating layer 24 is provided on the second electrode COML, and the pixel electrode 22 is provided on the insulating layer 24. The second substrate 31 is arranged on the first surface 21a side of the first substrate 21 in a manner separated therefrom. The third electrode TDL is provided on the second substrate 31 and faces the second substrate COML. In the configuration according to the present embodiment, the first electrodes 23, the TFT elements Tr, the second electrodes COML, and the third electrodes TDL are arranged in order from the first surface 21a of the first substrate 21. The first electrodes 23 are provided to a layer closer to the first surface 21a of the first substrate 21 than the data lines SGL and the gate lines GCL.

The semiconductor layer 61 may be made of a publicly known material, such as polysilicon and an oxide semiconductor. The use of a transparent amorphous oxide semiconductor (TAOS), for example, can increase the capacity (retention) to retain voltage for video display for a long time and improve the display quality.

The semiconductor layer 61 has channel forming portions 61a and 61b at portions under the gate electrodes 64. The wires 23a and 23b and the light-shielding portions 23c and 23d are provided under at least the channel forming portions 61a and 61b. The wires 23a and 23b and the light-shielding portions 23c and 23d have lower light transmittance than that of the first substrate 21. If the wires 23a and 23b and the light-shielding portions 23c and 23d are made of a metallic material, light does not virtually transmit through the wires 23a and 23b and the light-shielding portions 23c and 23d. Part of the wires 23a and 23b and the light-shielding portions 23c and 23d is provided at the same positions of the channel forming portions 61a and 61b of the semiconductor layer 61 in planar view below the channel forming portions 61a and 61b (on the side closer to the first substrate 21). This configuration blocks light output from the backlight 102 and entering into the channel forming portions 61a and 61b of the semiconductor layer 61, for example. Consequently, the present embodiment reduces a leakage current from the TFT element Tr, thereby suppressing a malfunction.

The first electrodes 23 according to the present embodiment are provided to a layer closer to the first surface 21a of the first substrate 21 than the TFT elements Tr. The second electrodes COML and the third electrodes TDL are provided to respective layers farther from the first surface 21a of the first substrate 21 than the TFT elements Tr. This configuration can reduce an effect of noise and stray capacitance of the TFT elements Tr and other components on the first electrodes 23 and the third electrodes TDL in force detection and touch detection, thereby improving the detection sensitivity. The first electrodes 23 are arranged between the TFT elements Tr and the first substrate 21 in a layer provided with a light-shielding layer below the semiconductor layer 61. In other words, even if the first electrodes 23 are provided, this configuration suppresses an increase in the number of laminated layers. The number of laminated layers at least above the TFT elements Tr (at a position away from the first surface 21a) need not be increased. Consequently, the thickness of the display device with a touch detection function 1 can be reduced.

Figure 25:
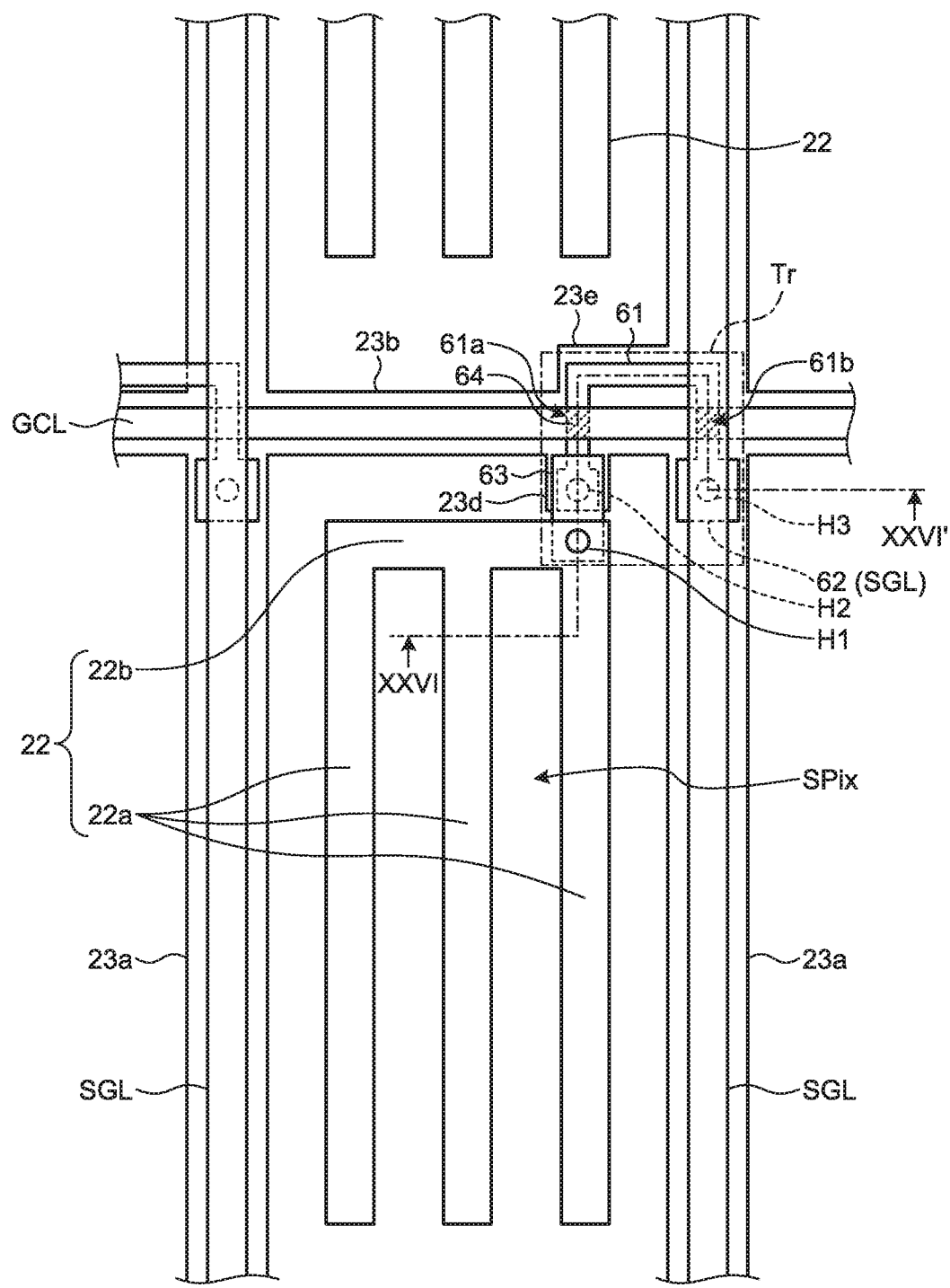
FIG. 25 is a plan view for explaining a configuration of the sub-pixels according to a modification of the first embodiment.
Figure 26:
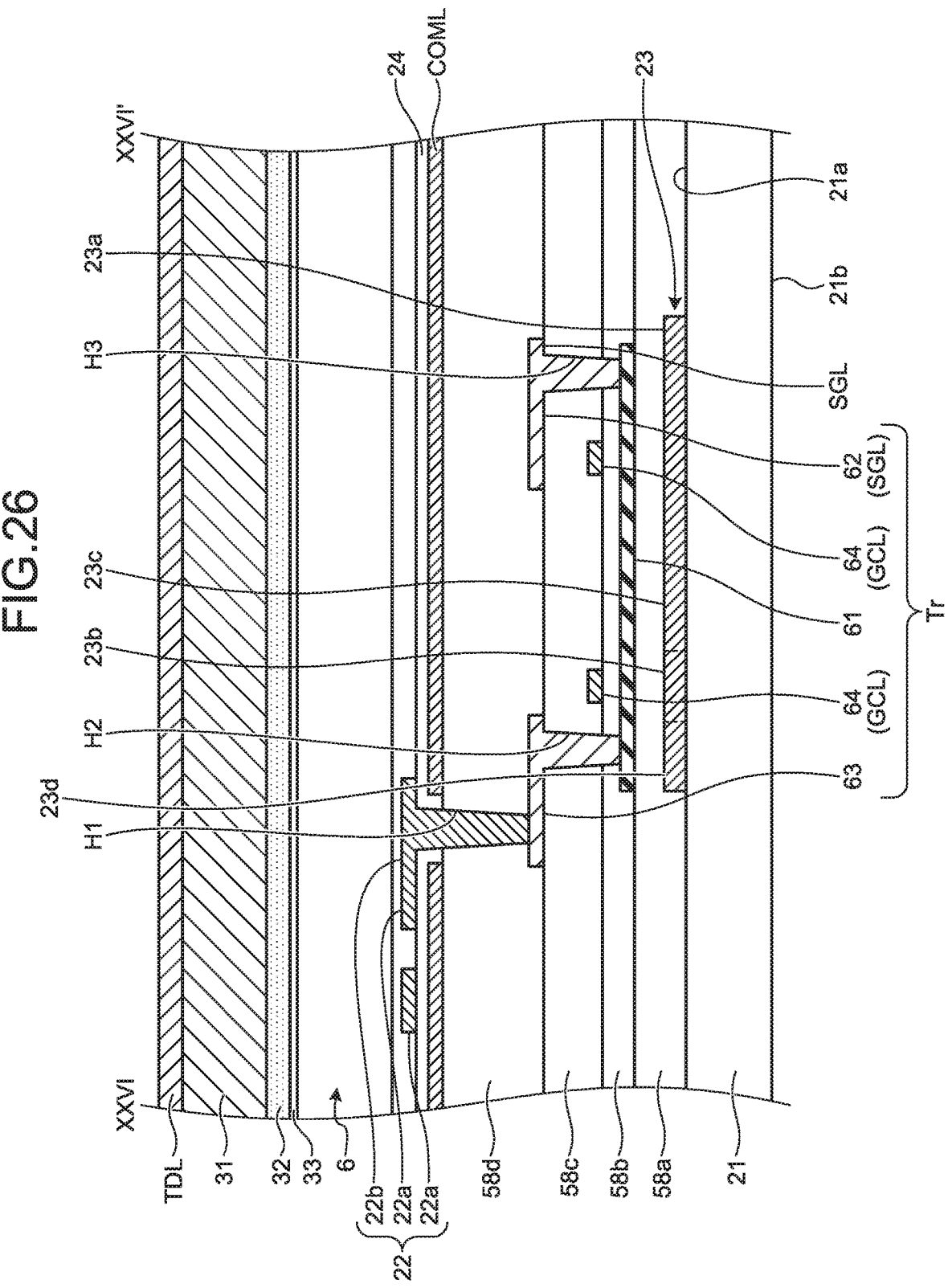
FIG. 26 is a sectional view along line XXVI-XXVI' in FIG. 25.

FIG. 25 is a plan view for explaining the configuration of the sub-pixels according to a modification of the first embodiment. FIG. 26 is a sectional view along line XXVI-XXVI' in FIG. 25. While the portion of the semiconductor layer 61 extending in parallel with the gate line GCL in FIGS. 23 and 24 does not overlap with the wires 23a and 23b and the light-shielding portions 23c and 23d, the embodiment is not limited thereto. As illustrated in FIG. 25, a light-shielding portion 23e according to the present modification is provided under the portion of the semiconductor layer 61 extending and intersecting with the gate line GCL and the portion extending in parallel with the gate line GCL. As illustrated in FIGS. 25 and 26, the first electrode 23 including the wires 23a and 23b and the light-shielding portions 23d and 23e covers the entire semiconductor layer 61. This configuration blocks light output from the backlight 102 and entering into the semiconductor layer 61.

Figure 27:
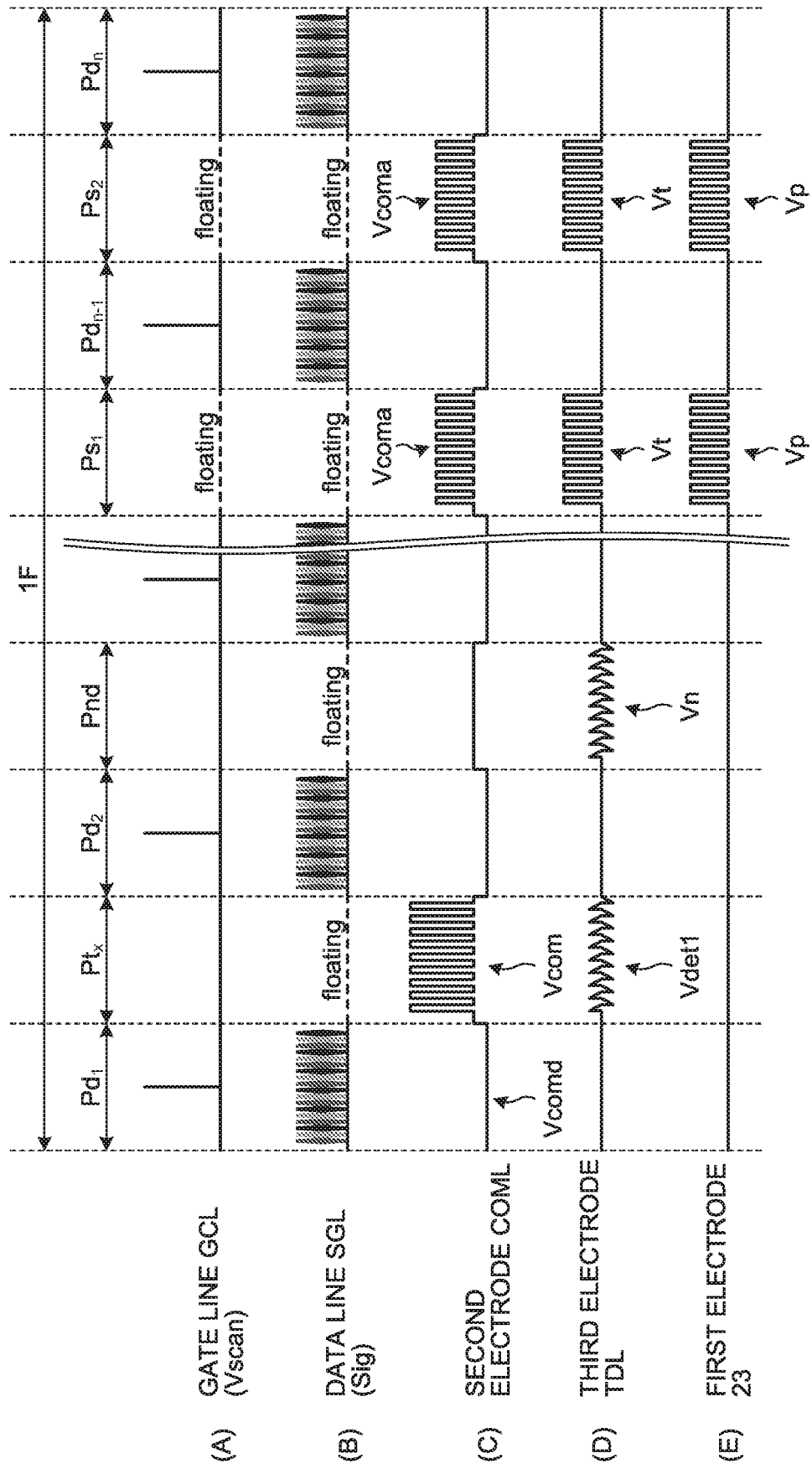
FIG. 27 is a timing waveform diagram of an exemplary operation performed by the display device with a touch detection function according to the first embodiment.
Figure 28:
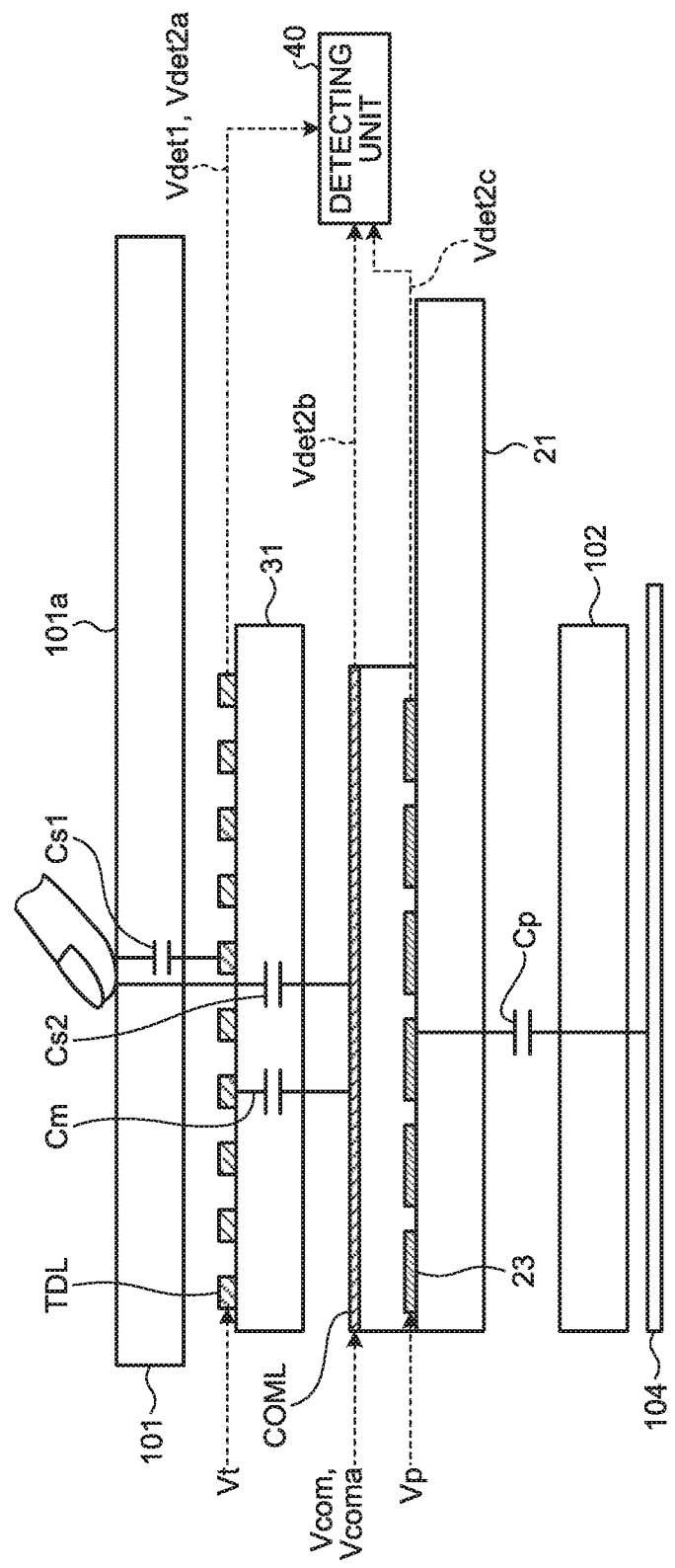
FIG. 28 is a diagram for explaining a relation of the electrodes in a detection operation.

The following describes an example of an operating method according to the present embodiment. FIG. 27 is a timing waveform diagram of an exemplary operation performed by the display device with a touch detection function according to the first embodiment. FIG. 28 is a diagram for explaining a relation of the electrodes in a detection operation. In an example of an operating method of the display device with a touch detection function 1, the display device with a touch detection function 1 performs a touch detection operation (touch detection period), a force detection operation (force detection period), and a display operation (display operation period) in a time division manner. The display device with a touch detection function 1 may perform the touch detection operation, the force detection operation, and the display operation in any division manner. The following describes a case where the display device with a touch detection function 1 performs the touch detection operation, the force detection operation, and the display operation such that the operations are each divided into a plurality of parts in one frame period (1F) of the display panel 20, that is, in a time required to display video information of one screen.

As illustrated in FIG. 27, one frame period (1F) includes a plurality of display operation periods $Pd_1$, $Pd_2$, ... $Pd_n$, a detection period $Pt_x$ for performing a mutual capacitance touch detection operation, a noise detection period Pnd for detecting noise, and a plurality of detection periods $Ps_1$ and $Ps_2$ for performing a self-capacitance detection operation. These periods are alternately arranged on a temporal axis as follows: the display operation period $Pd_1$, the detection period $Pt_x$, the display operation period $Pd_2$, the noise detection period Pnd, the display operation period $Pd_1$, the detection period $Ps_1$, etc. The display operations and the detection operations are switched based on the control signals supplied from the control unit 11.

The control unit 11 turns on (high level) the scanning signals Vscan via the gate driver 12, thereby selecting pixels Pix (refer to FIG. 18) serving as targets of display drive in the display operation periods $Pd_1$, $Pd_2$, ... $Pd_n$. The control unit 11 supplies the pixel signals Vpix to the pixels Pix in a plurality of rows selected in the display operation periods $Pd_1$, $Pd_2$, ... $Pd_n$ via the source driver 13. FIG. 27 illustrates video signals (Sig) for respective colors of RGB. Sub-pixels SPix corresponding to the respective colors of RGB are selected, and the video signals (Sig) for the respective colors are supplied to the selected sub-pixels SPix, whereby an operation for displaying an image is performed. In the display operation periods $Pd_1$, $Pd_2$, ... $Pd_n$, an image obtained by dividing the video signals Vdisp of one screen into n is displayed. Through the display operation periods $Pd_1$, $Pd_2$, ... $Pd_n$, video information of one screen is displayed. The second electrodes COML also serve as the common electrodes of the display panel 20. In the display operation periods $Pd_1$, $Pd_2$, ... $Pd_n$, the first electrode driver 14 supplies, to the selected second electrodes COML, the second drive signals Vcom (display drive signals Vcomd) having a common potential for display drive.

In the detection periods $Pt_x$, the control unit 11 outputs control signals to the first electrode driver 14. The first electrode driver 14 supplies the second drive signals Vcom for touch detection to the second electrodes COML. Based on the basic principle of mutual capacitance touch detection, the third electrodes TDL output the first detection signals Vdet1 depending on a change in capacitance Cm formed between the second electrodes COML and the third electrodes TDL. The detecting unit 40 determines whether touch input is performed on the display area 10a and calculates the coordinates of the input position from the first detection signals Vdet1.

In the detection period $Pt_x$, the data lines SGL may be in a floating state where no voltage signal is supplied thereto and their electric potential is not fixed. This mechanism can suppress capacitive coupling between the second electrodes COML and the data lines SGL and reduce stray capacitance, thereby suppressing reduction in the detection sensitivity in touch detection. The gate lines GCL and the data lines SGL may be supplied with guard signals synchronized with and having the same waveform as that of the second drive signals Vcom. While FIG. 27 illustrates only one detection period $Pt_x$, one frame period may include a plurality of detection periods $Pt_x$ (e.g., x=1, 2, . . . m).

In the noise detection period Pnd, the first electrode driver 14 stops supplying the second drive signals Vcom to the second electrodes COML. The third electrodes TDL output noise signals Vn intruding from the outside to the detecting unit 40. The detecting unit 40 derives information on the noise, such as the frequency and the amplitude of the noise signals Vn. Based on the information on the noise, the control unit 11 can control the detection operations. The control unit 11, for example, may change the frequency and the amplitude of the second drive signals Vcom or change the frequency at which the display operation and the detection operations are repeatedly performed.

In the detection periods $Ps_1$ and $Ps_2$, the control unit 11 outputs control signals to the first electrode driver 14 and the second electrode driver 48. The first electrode driver 14 supplies the first drive signals Vp to the first electrodes 23. As illustrated in FIG. 28, based on the detection principle of the self-capacitance method, the first electrodes 23 output second detection signals Vdet2c to the detecting unit 40 depending on a change in capacitance Cp generated between the first electrodes 23 and the conductor 104. The detecting unit 40 calculates force applied to the input surface 101a (refer to FIG. 11 and other figures) from the second detection signals Vdet2c.

Simultaneously with this operation, the first electrode driver 14 supplies second drive signals Vcoma to the second electrodes COML. Based on the detection principle of the self-capacitance method, the second electrodes COML output second detection signals Vdet2b to the detecting unit 40 depending on a change in capacitance Cs2 (refer to FIG. 28) generated between the second electrodes COML and a finger or the like in contact with or in proximity to the input surface 101a. In this case, the detecting unit 40 detects a position where the finger is in contact with or in proximity to the input surface 101a in the first direction Dx (refer to FIG. 15) in which the second electrodes COML are arrayed. The second electrode driver 48 supplies the third drive signals Vt to the third electrodes TDL. Based on the detection principle of the self-capacitance method, the third electrodes TDL output second detection signals Vdet2a to the detecting unit 40 depending on a change in capacitance Cs1 generated between the third electrodes TDL and the finger or the like in contact with or in proximity to the input surface 101a. In this case, the detecting unit 40 detects a position where the finger is in contact with or in proximity to the input surface 101a in the second direction Dy (refer to FIG. 17) in which the third electrodes TDL are arrayed. The coordinate extracting unit 45 calculates and outputs the touch panel coordinates of the position where the finger is in contact with or in proximity to the input surface 101a based on the second detection signals Vdet2b and the second detection signals Vdet2a.

As described above, in the detection periods $Ps_1$ and $Ps_2$, the first drive signals Vp, the second drive signals Vcoma, and the third drive signals Vt are simultaneously supplied. In response to these signals, the display device with a touch detection function 1 simultaneously performs the force detection operation with the first electrodes 23 and the touch detection operation with the second electrodes COML and the third electrodes TDL. In this case, by causing the first drive signals Vp, the second drive signals Vcoma, and the third drive signals Vt to be synchronized with one another and have the same amplitude, the second drive signals Vcoma serve as guard signals. Because the second electrodes COML are driven in synchronization with and at the same electric potential as that of the first electrodes 23, stray capacitance between the first electrodes 23 and the second electrodes COML is reduced. Because the second electrodes COML are driven in synchronization with and at the same electric potential as that of the third electrodes TDL, stray capacitance between the third electrodes TDL and the second electrodes COML is reduced. As described above, the second electrodes COML serve as the guard electrodes for the first electrodes 23 and the guard electrodes for the third electrodes TDL. With this configuration, the first electrodes 23, the second electrodes COML, and the third electrodes TDL simultaneously perform the detection operations.

In the detection periods $Ps_1$ and $Ps_2$, the gate lines GCL and the data lines SGL are preferably in a floating state where no voltage signal is supplied thereto and their electric potential is not fixed. This mechanism can reduce stray capacitance between the gate lines GCL and the data lines SGL and the electrodes, thereby suppressing reduction in the detection sensitivity.

While one frame period (1F) in the example illustrated in FIG. 27 includes two detection periods $Ps_1$ and $Ps_2$, the embodiment is not limited thereto. One frame period (1F) simply needs to include at least one detection period Ps and may include three or more detection periods Ps. The detection operations performed with the first electrodes 23, the second electrodes COML, and the third electrodes TDL may be carried out in different periods.

As described above, the first electrodes 23 in the display device with a touch detection function 1 according to the first embodiment are provided to a layer closer to the first surface 21a of the first substrate 21 than the TFT elements Tr in the direction perpendicular to the first surface 21a. Based on a change in the capacitance generated between the first electrodes 23 and the conductor 104 arranged on the second surface 21b side of the first substrate 21, the display device with a touch detection function 1 can detect force applied to the input surface 101a. Because the first electrodes 23 are provided to a layer closer to the first substrate 21 than the second electrodes COML and the third electrodes TDL, the display device with a touch detection function 1 can detect a finger or the like in contact with or in proximity to the input surface 101a with the second electrodes COML and the third electrodes TDL. The display device with a touch detection function 1 according to the present embodiment thus can detect a touch made on both of the first surface 21a side and the second surface 21b side of the first substrate 21. Consequently, the display device with a touch detection function 1 is applicable to various applications and user interfaces.

Second Embodiment

Figure 29:
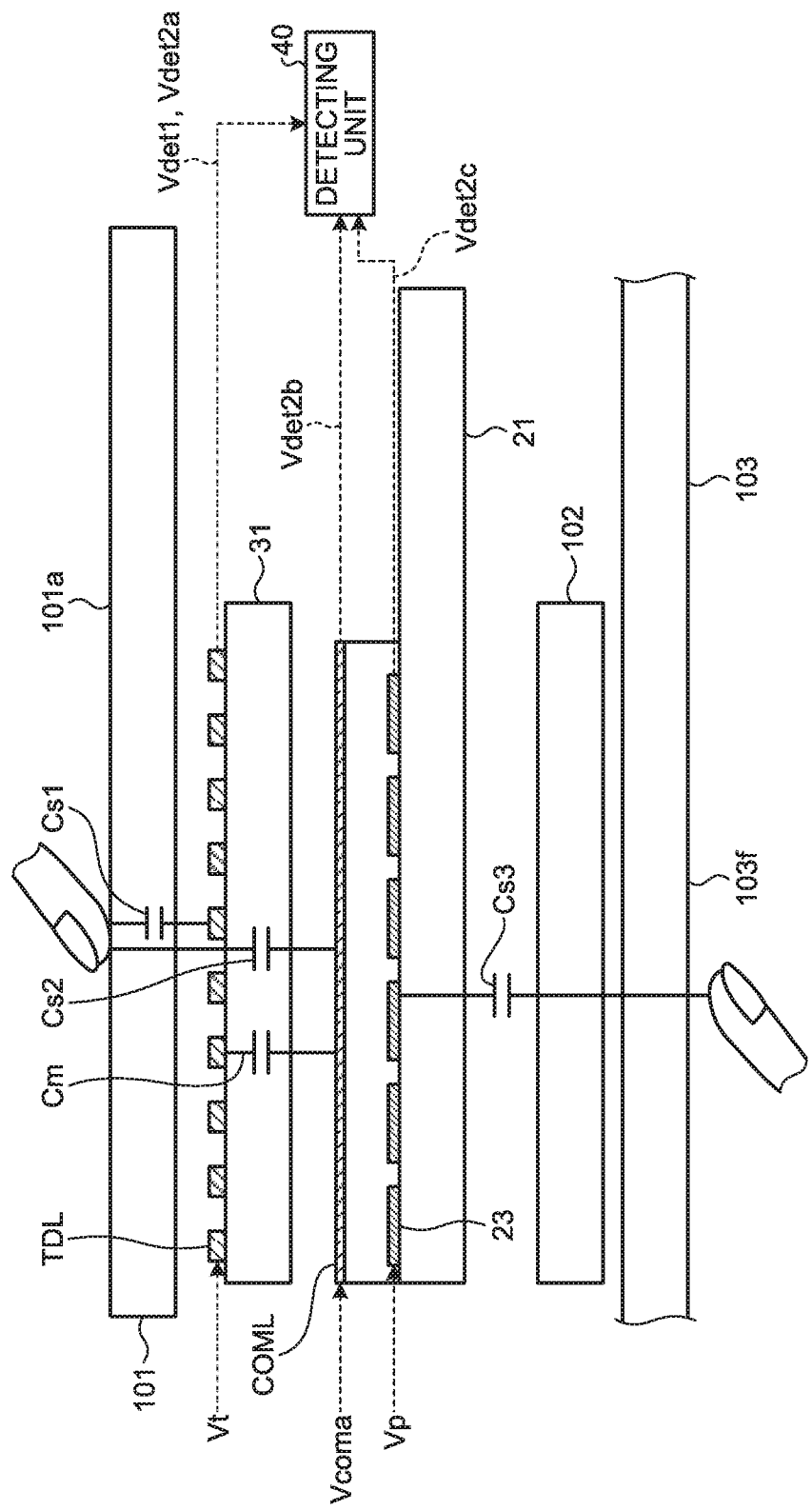
FIG. 29 is a diagram for explaining a relation of the electrodes in a detection operation in the display device with a touch detection function according to a second embodiment.

FIG. 29 is a diagram for explaining a relation of the electrodes in a detection operation in the display device with a touch detection function according to a second embodiment. While the first embodiment detects force with the first electrodes 23, the first electrodes 23 can also detect a finger or the like in contact with or in proximity to the display device. As illustrated in FIG. 29, the housing 103 is arranged facing the first substrate 21 on the opposite side of the cover member 101 with respect to the first substrate 21. By using the housing 103 made of an insulating material, such as a resin, capacitance Cs3 is generated between a finger or the like in contact with or in proximity to a bottom surface 103*f* of the housing 103 and the first electrodes 23.

The first electrode driver 14 supplies the first drive signals Vp to the first electrodes 23. Based on the detection principle of the self-capacitance method, the first electrodes 23 output the second detection signals Vdet2*c* to the detecting unit 40. Because the first electrodes 23 are arrayed in a matrix (refer to FIG. 16), the detecting unit 40 can detect the position of the finger or the like in contact with or in proximity to the bottom surface 103*f* of the housing 103 based on the second detection signals Vdet2*c* supplied from the respective first electrodes 23.

The present embodiment can also perform the touch detection operation with the second electrodes COML and the third electrodes TDL based on the detection principle of the self-capacitance method in the same period as that of the touch detection operation performed with the first electrodes 23. The second drive signals Vcoma are supplied to the second electrodes COML, and the third drive signals Vt are supplied to the third electrodes TDL. The second electrodes COML output the second detection signals Vdet2*b* to the detecting unit 40, and the third electrodes TDL output the second detection signals Vdet2*a* to the detecting unit 40. As a result, the detecting unit 40 detects a position of a finger or the like in contact with or in proximity to the input surface 101*a*. In this case, the gate lines GCL and the data lines SGL are preferably in a floating state where no voltage signal is supplied thereto and their electric potential is not fixed. This mechanism can reduce stray capacitance between the gate lines GCL and the data lines SGL and the electrodes. The present embodiment may perform the touch detection operation depending on a change in the capacitance Cm generated between the second electrodes COML and the third electrodes TDL based on the detection principle of the mutual capacitance method.

Figure 30:
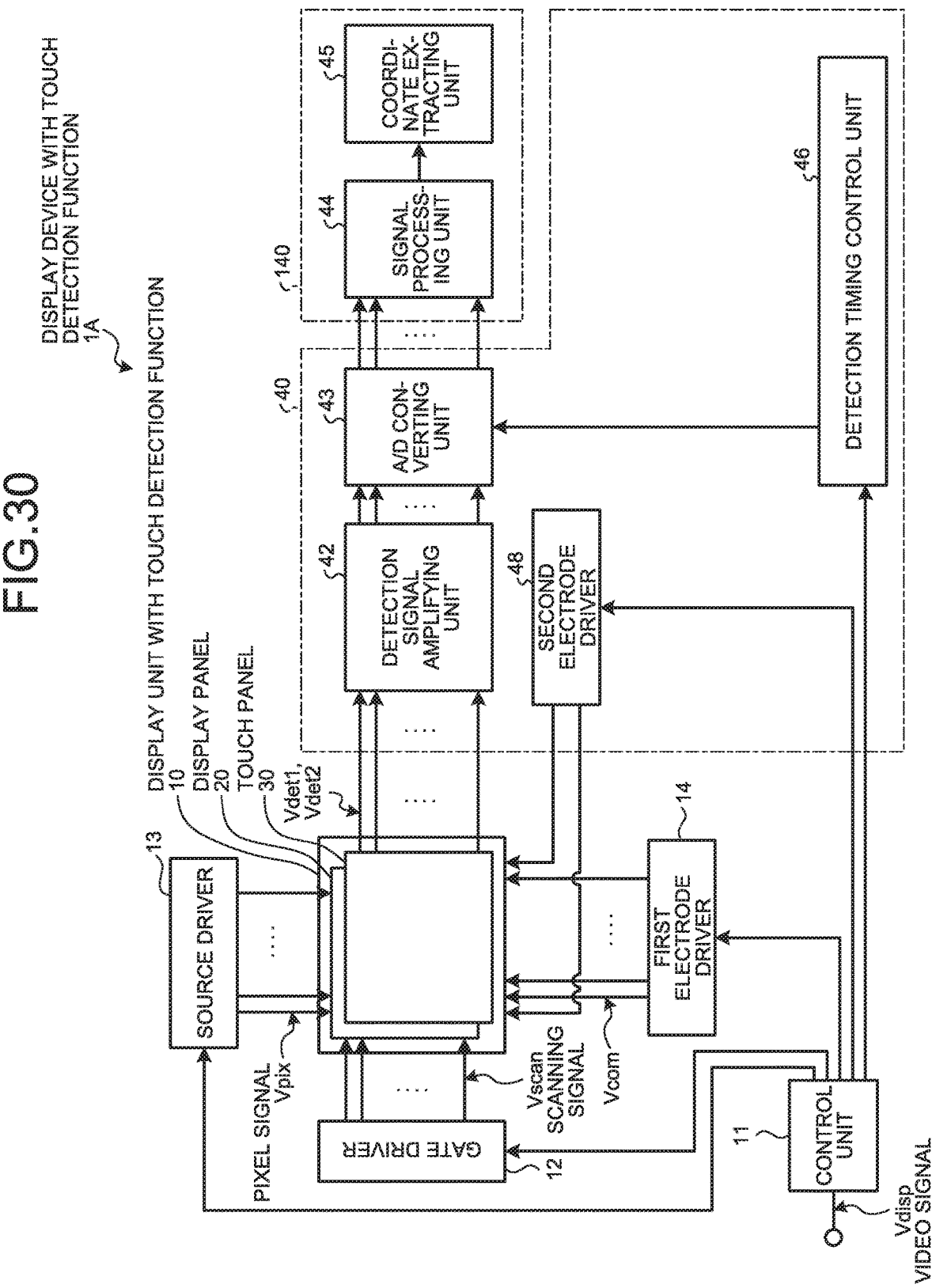
FIG. 30 is a block diagram of an exemplary configuration of the display device with a touch detection function according to the second embodiment.
Figure 31:
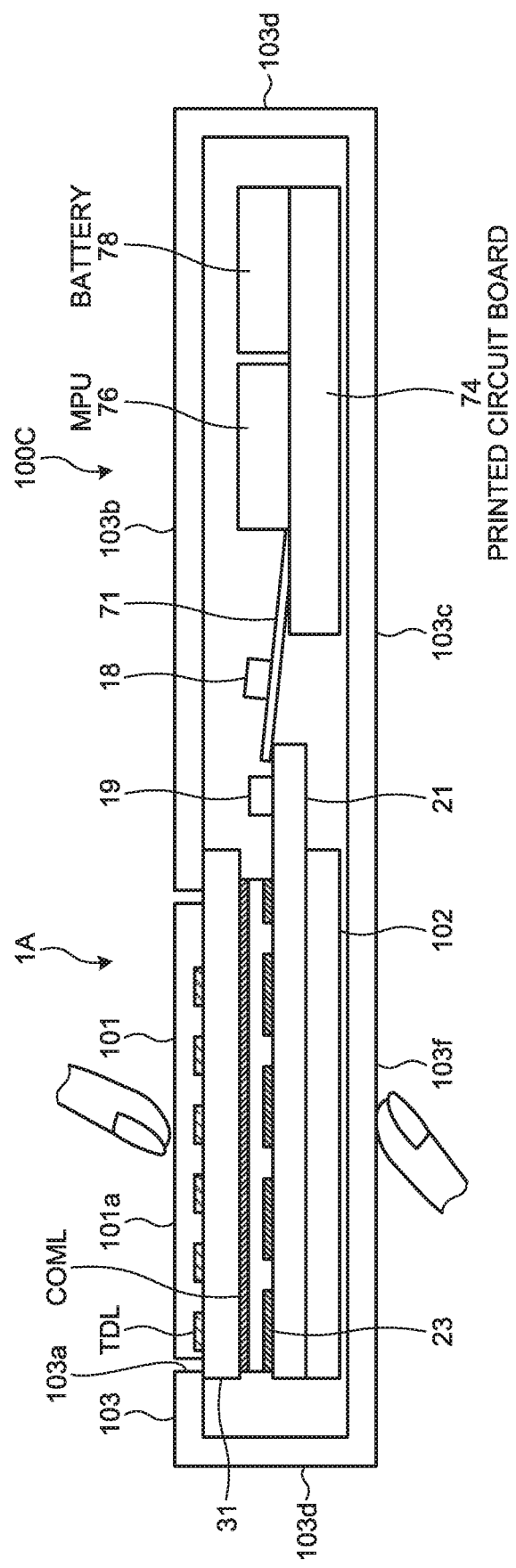
FIG. 31 is a sectional view of a schematic sectional structure of a display device including the display device with a touch detection function according to the second embodiment and the housing.

FIG. 30 is a block diagram of an exemplary configuration of the display device with a touch detection function according to the second embodiment. FIG. 31 is a sectional view of a schematic sectional structure of a display device including the display device with a touch detection function according to the second embodiment and the housing. As illustrated in FIG. 30, the detecting unit 40 in a display device with a touch detection function 1A includes the detection signal amplifying unit 42 and the A/D converting unit 43. The signal processing unit 44 and the coordinate extracting unit 45 are included in an external processor 140. Output signals from the A/D converting unit 43 are supplied to the signal processing unit 44 of the external processor 140. The signal processing unit 44 and the coordinate extracting unit 45 derive the position of touch input. A display device 100C illustrated in FIG. 31 includes the display device with a touch detection function 1A, the housing 103, a printed circuit board 74, an MPU 76, and a battery 78. The display device 100C is a thin module, such as a card-type terminal. The MPU 76 according to the present embodiment includes the processor 140 illustrated in FIG. 30.

The housing 103 includes a plate-like upper substrate 103*b*, a plate-like lower substrate 103*c*, and side plates 103*d*. The upper substrate 103*b* is arranged facing the lower substrate 103*c*. The display device with a touch detection function 1A, the printed circuit board 74, the MPU 76, and the battery 78 are accommodated in the space surrounded by the upper substrate 103*b*, the plate-like lower substrate 103*c*, and the side plates 103*d*.

The MPU 76 and the battery 78 are mounted on the printed circuit board 74. The printed circuit board 74 is coupled to the display device with a touch detection function 1A via the flexible substrate 71. With this configuration, the display control IC 19 and the touch detection IC 18 are coupled to the MPU 76. Based on control signals supplied from the MPU 76, various functions, such as the display operation and the detection operation, are performed.

The upper substrate 103*b* has an opening 103*a*, and the cover member 101 is arranged in the opening 103*a*. A display image on the display device with a touch detection function 1A is viewed through the cover member 101 by the observer. The surface of the cover member 101 serves as the input surface 101*a* with or to which the observer brings the finger or the like into contact or into proximity to perform a touch input operation. The present embodiment detects the finger in contact with or in proximity to the input surface 101*a* with the second electrodes COML and the third electrodes TDL. The present embodiment detects a finger or the like in contact with or in proximity to the bottom surface 103*f* provided on the opposite side of the input surface 101*a* with respect to the first substrate 21, with the first electrodes 23. Because the display device 100C according to the present embodiment can receive touch input on both surfaces of the housing 103, the display device 100C is applicable to various applications and user interfaces.

Third Embodiment

Figure 32:
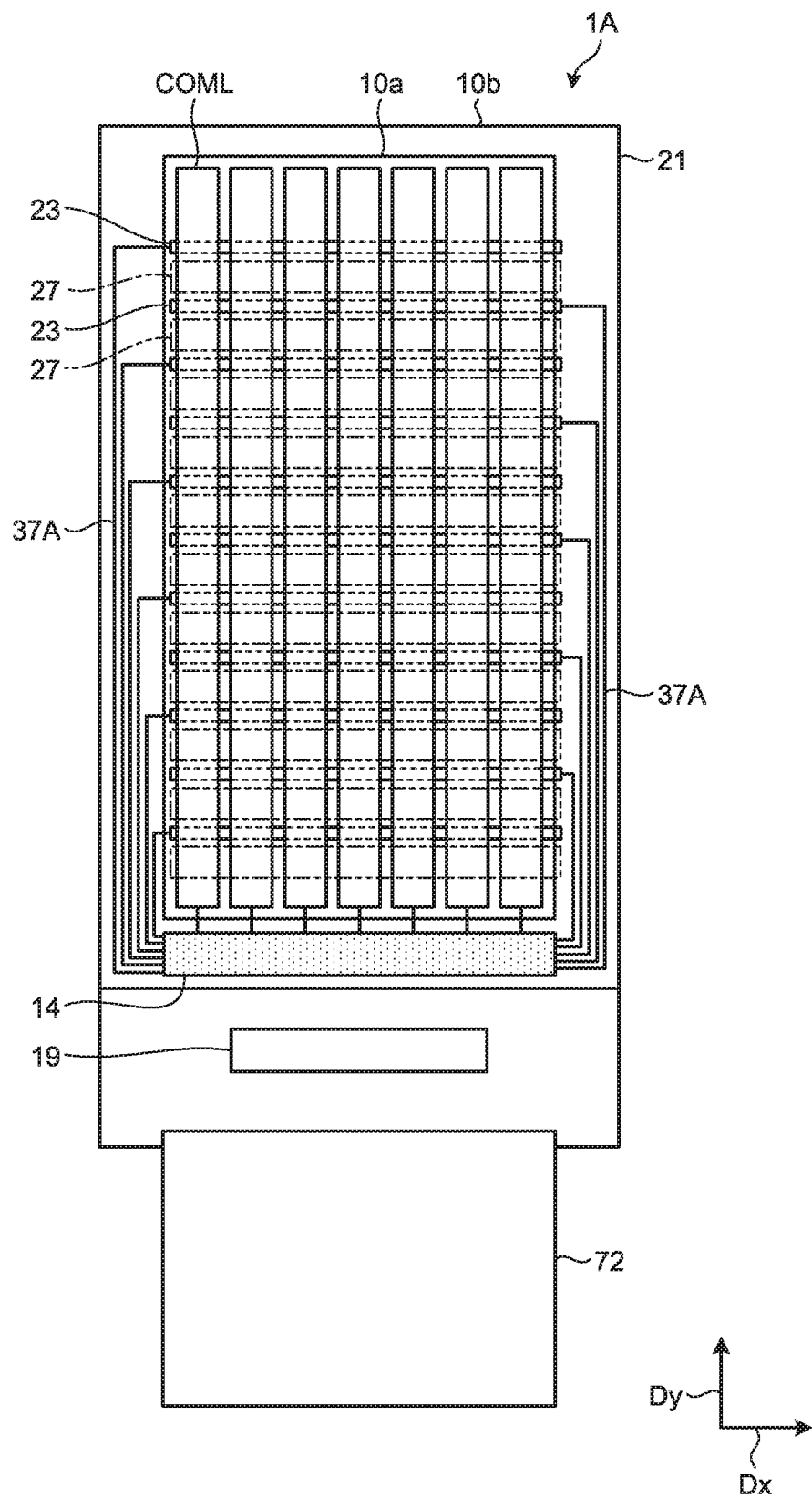
FIG. 32 is a plan view schematically illustrating the first substrate of the display device with a touch detection function according to a third embodiment.
Figure 33:
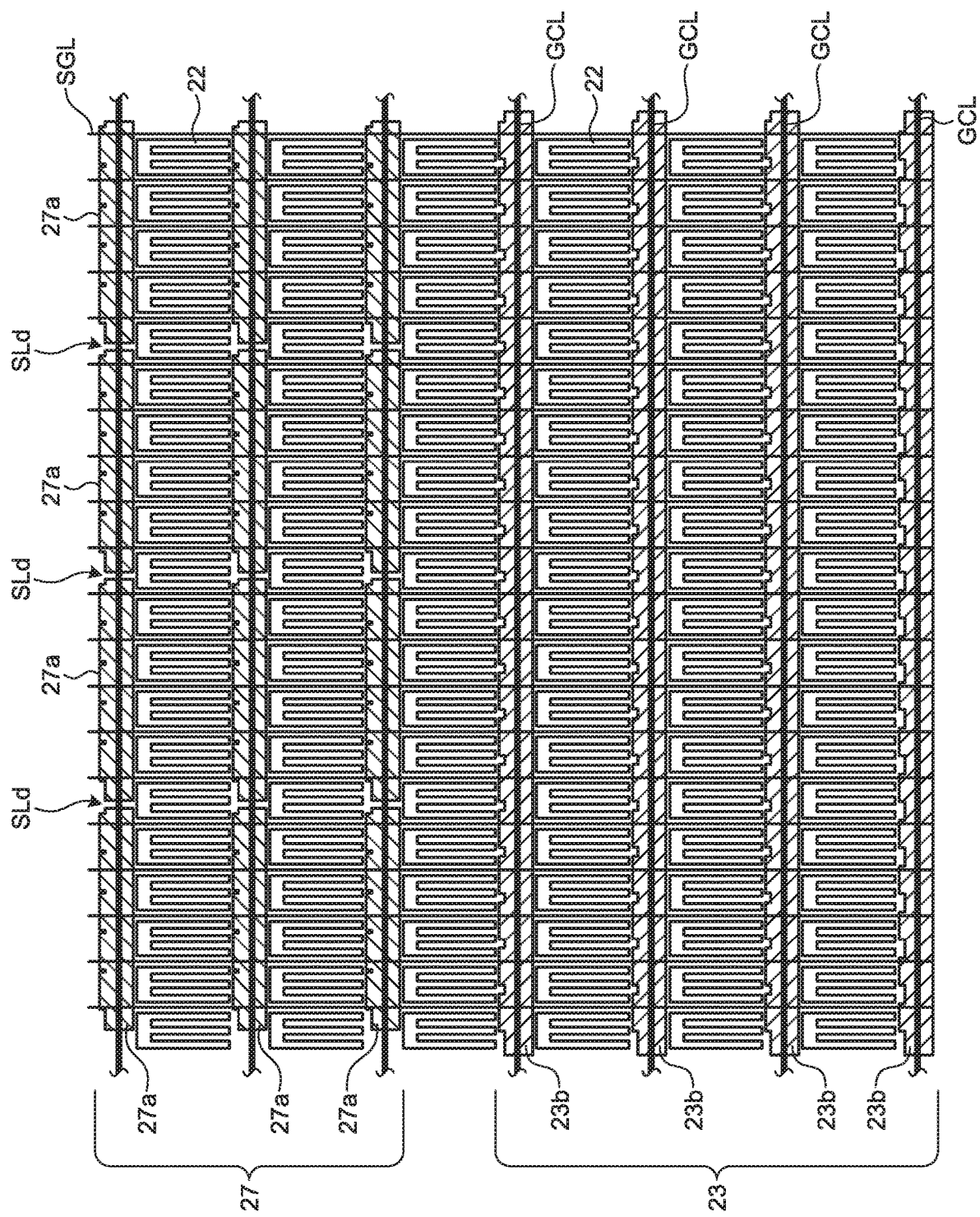
FIG. 33 is a schematic plan view illustrating the first electrodes according to the third embodiment in an enlarged manner.

FIG. 32 is a plan view schematically illustrating the first substrate of the display device with a touch detection function according to a third embodiment. FIG. 33 is a schematic plan view illustrating the first electrodes according to the third embodiment in an enlarged manner. As illustrated in FIG. 32, the display area 10*a* of the first substrate 21 in a display device with a touch detection function 1B according to the present embodiment is provided with the first electrodes 23, the second electrodes COML, and dummy electrode areas 27. The first electrodes 23 extend in a direction intersecting with the extending direction of the second electrodes COML. In other words, the first electrodes 23 extend in the first direction Dx and are arrayed in the second direction Dy intersecting with the first direction Dx. Frame wires 37A are provided in the frame area 10*b* to couple respective ends of the first electrodes 23 in the extending direction to the first electrode driver 14.

The dummy electrode areas 27 each include a plurality of wires 27*a* (described later). The wire 27*a* is an electrode that does not serve as a detection electrode. The dummy electrode areas 27 are provided between the first electrodes 23 arrayed in the second direction Dy. The wire 27*a* in the dummy electrode areas 27 is divided into a plurality of parts in the first direction Dx (described later). The dummy electrode areas 27 extend as a whole in a direction along the extending direction of the first electrodes 23.

As illustrated in FIG. 33, one first electrode 23 includes a plurality of wires 23*b*. The wires 23*b* are provided under the respective gate lines GCL and consecutively extend in a direction along the extending direction of the gate lines GCL. The wires 23*b* are arranged at positions not under the pixel electrodes 22 and arrayed in a direction intersecting with the extending direction of the gate lines GCL. The present embodiment does not include the wire 23*a* (refer to FIG. 22) arranged under the data lines SGL. The wire 23*a* arranged under the data lines SGL may be provided to couple the wires 23*b* included in one first electrode 23.

The dummy electrode areas 27 each include the wires 27*a* divided by slits SLd. The wires 27*a* are provided under the respective gate lines GCL and arrayed in a direction along the extending direction of the gate lines GCL. The wires 27*a* are provided at positions not under the pixel electrodes 22 and arrayed in a direction intersecting with the extending direction of the gate lines GCL. The wire 27*a* is a metallic wire provided to the same layer as that of the wire 23*b* constituting the first electrodes 23. In the configuration according to the present embodiment, four wires 27*a* are aligned in the extending direction of the gate lines GCL. Alternatively, the wire 27*a* may be divided into five or more parts or three or less parts. The configuration illustrated in FIG. 33 is given by way of example only, and the number of wires 23*b* included in one first electrode 23 and the number of wires 27*a* included in one dummy electrode area 27 may be appropriately changed.

With the first electrodes 23 and the dummy electrode areas 27 including the wire 27*a*, the lines of electric force generated from the second electrodes COML pass through the gaps between adjacent first electrodes 23 and extend toward the second surface 21*b* (refer to FIG. 24) of the first substrate 21. The present embodiment can detect the position of a finger or the like in contact with or in proximity to the second surface 21*b* side in the second direction Dy with the first electrodes 23 based on the detection principle of the self-capacitance method. The present embodiment can also detect the position of the finger or the like in contact with or in proximity to the second surface 21*b* side in the first direction Dx with the second electrodes COML based on the detection principle of the self-capacitance method. The present embodiment thus can detect the position of the finger or the like in contact with or in proximity to the second surface 21*b* side with the first electrodes 23 and the second electrodes COML. The present embodiment can also perform the touch detection operation with the third electrodes TDL based on the detection principle of the self-capacitance method in the same period as that of the touch detection operation with the first electrodes 23 and the second electrodes COML.

As described above, the second electrodes COML serve as drive electrodes to detect the position of a finger or the like in contact with or in proximity to the first surface 21*a* side of the first substrate 21 based on the detection principle of the mutual capacitance method. In other words, the second electrodes COML according to the present embodiment have both of the function of drive electrodes to detect a finger or the like in contact with or in proximity to the first surface 21*a* side of the first substrate 21 and the function of detection electrodes to detect a finger or the like in contact with or in proximity to the second surface 21*b* side of the first substrate 21. If the conductor 104 is provided on the second surface 21*b* side of the first substrate 21, the present embodiment can detect force with the first electrodes 23 and the second electrodes COML based on the detection principle of the self-capacitance method.

Fourth Embodiment

Figure 34:
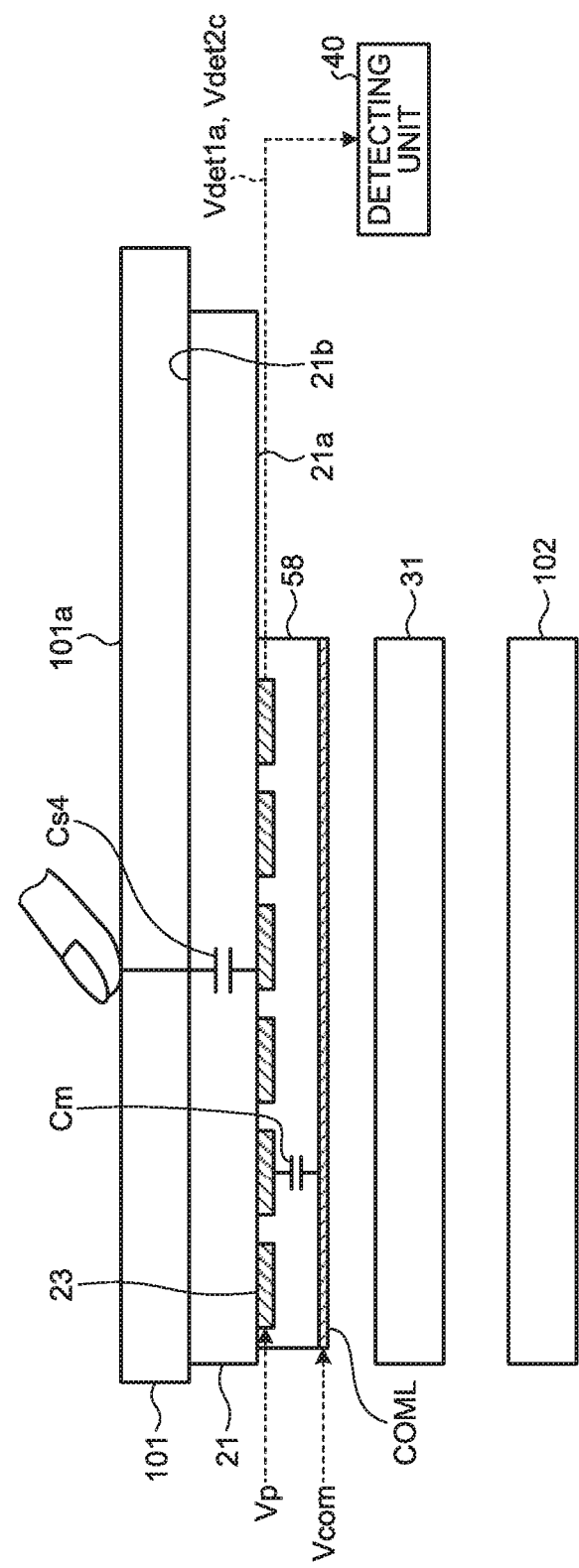
FIG. 34 is a diagram for explaining a configuration of the display device with a touch detection function according to a fourth embodiment.

FIG. 34 is a diagram for explaining a configuration of the display device with a touch detection function according to a fourth embodiment. The first substrate 21 according to the present embodiment is arranged on the cover member 101 side, and the second substrate 31 is arranged on the opposite side of the cover member 101 with respect to the first substrate 21. The first surface 21*a* of the first substrate 21 faces the second substrate 31, and the second surface 21*b* faces the cover member 101. The first electrodes 23 are provided on the first surface 21*a* side of the first substrate 21. The second electrodes COML are provided facing the first electrodes 23 with the insulating layer 58 interposed therebetween. In the configuration according to the present embodiment, the first electrodes 23 and the second electrodes COML are arranged in order from the input surface 101*a* in a direction perpendicular to the first surface 21*a* of the first substrate 21. The layer configuration of the electrodes and the TFT elements Tr formed on the first substrate 21 according to the present embodiment is the same as that illustrated in FIG. 24. In other words, the TFT elements Tr are arranged between the first electrodes 23 and the second electrodes COML in the direction perpendicular to the first surface 21*a* of the first substrate 21.

With the first electrodes 23 arranged in a matrix as illustrated in FIG. 16, the present embodiment can detect the position of a finger or the like in contact with or in proximity to the input surface 101*a* based on the detection principle of the self-capacitance method. The first electrode driver 14 supplies the first drive signals Vp to the first electrodes 23. The first electrodes 23 output the second detection signals Vdet2*c* to the detecting unit 40 depending on a change in capacitance Cs4 generated between the first electrodes 23 and the finger or the like in contact with or in proximity to the input surface 101*a*. Based on the second detection signals Vdet2*c*, the coordinate extracting unit 45 calculates and outputs the touch panel coordinates of the position where the finger is in contact with or in proximity to the input surface 101*a*.

The first electrode driver 14 supplies the second drive signals Vcom synchronized with and having the same amplitude as that of the first drive signals Vp to the second electrodes COML. Because the second electrodes COML are driven in synchronization with and at the same electric potential as that of the first electrodes 23, stray capacitance between the first electrodes 23 and the second electrodes COML is reduced. In this example, the second electrodes COML serve as guard electrodes, and the second drive signals Vcom are supplied as guard signals.

The first electrodes 23 and the second electrodes COML may be provided in patterns extending in directions intersecting with each other as illustrated in FIG. 32. With this configuration, the present embodiment can detect the position of a finger or the like in contact with or in proximity to the input surface 101*a* based on the detection principle of the mutual capacitance method. In this case, the first electrodes 23 serve as detection electrodes, and the second electrodes COML serve as drive electrodes. The first electrode driver 14 supplies the second drive signals Vcom to the second electrodes COML. The first electrodes 23 output first detection signals Vdet1*a* to the detecting unit 40 based on a change in the capacitance Cm generated between the first electrodes 23 and the second electrodes COML. Based on the first detection signals Vdet1*a*, the coordinate extracting unit 45 calculates and outputs the touch panel coordinates of the position where the finger is in contact with or in proximity to the input surface 101*a*.

Also in the present embodiment, the first electrodes 23 are provided to a layer closer to the first surface 21*a* of the first substrate 21 than the TFT elements Tr (not illustrated in FIG.

34). With this configuration, the present embodiment can favorably detect a finger or the like in contact with or in proximity to the second surface 21b side (input surface 101a side) of the first substrate 21.

Fifth Embodiment

Figure 35:
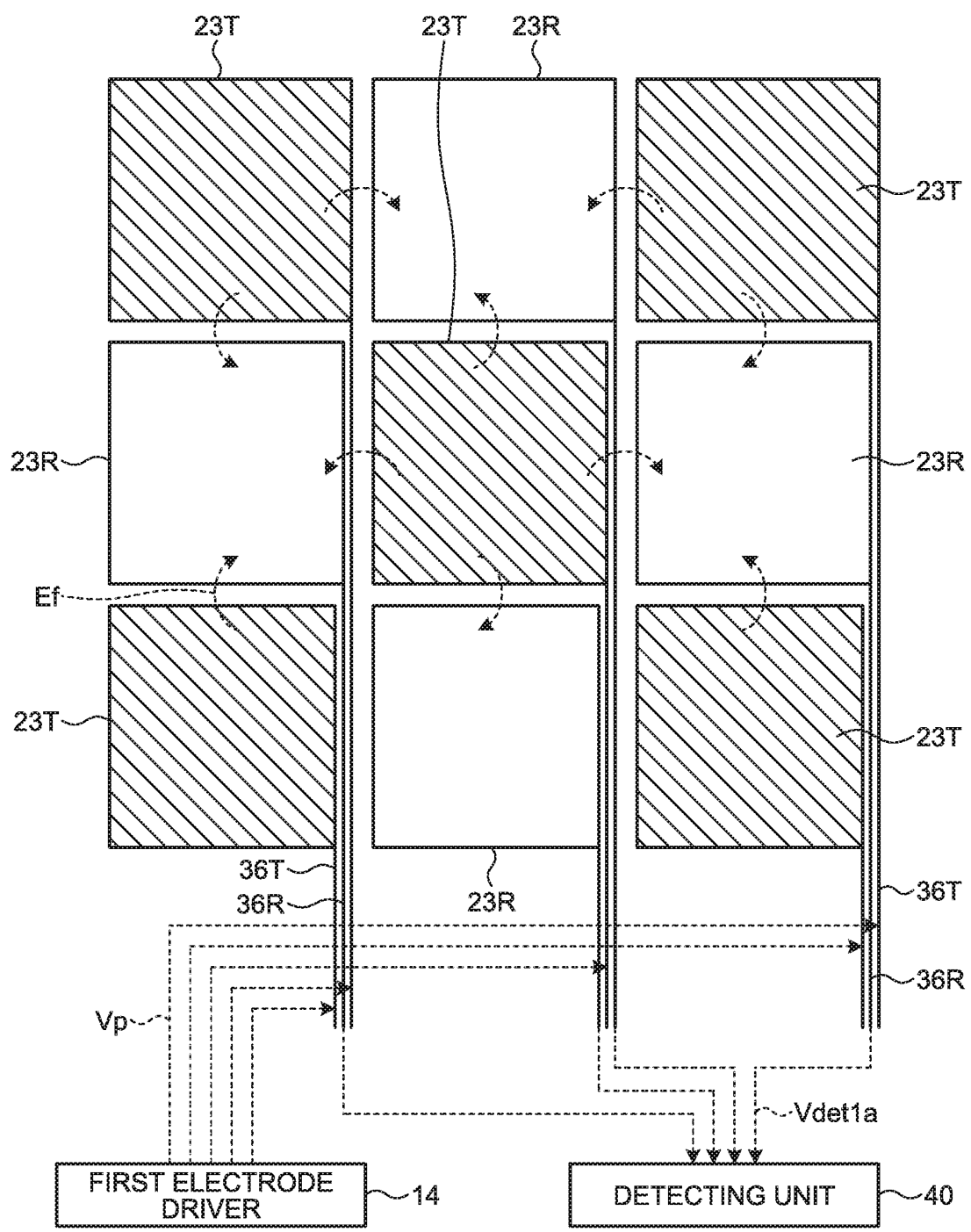
FIG. 35 is a plan view illustrating the first electrodes of the display device with a touch detection function according to a fifth embodiment in an enlarged manner.

FIG. 35 is a plan view illustrating the first electrodes of the display device with a touch detection function according to a fifth embodiment in an enlarged manner. While the first to the fourth embodiments perform the detection operation with the first electrodes 23 based on the detection principle of the self-capacitance method, the present invention is not limited thereto. The present embodiment describes an example of a detection operation with the first electrodes 23 based on the detection principle of the mutual capacitance method.

As illustrated in FIG. 35, a plurality of first electrodes 23T and a plurality of first electrodes 23R are arranged in a matrix. The first electrodes 23T and the first electrodes 23R are alternately arrayed in the row direction and the column direction. Capacitance is generated between a first electrode 23T and first electrodes 23R arranged around the first electrode 23T.

The first electrodes 23T are electrically coupled to the first electrode driver 14 via coupling wires 36T, and the first electrodes 23R are electrically coupled to the detecting unit 40 via coupling wires 36R. The first drive signals Vp are supplied from the first electrode driver 14 to the first electrodes 23T, thereby generating fringe electric fields Ef between the first electrodes 23T and the first electrodes 23R. A finger or the like in contact with or in proximity to the display device blocks the fringe electric fields Ef, thereby reducing the capacitance between the first electrodes 23T and the first electrodes 23R. The first electrodes 23R output the first detection signals Vdet1a to the detecting unit 40. The detecting unit 40 detects a position where the finger is in contact with or in proximity to the second surface 21b side (refer to FIG. 24) of the first substrate 21. The first electrodes 23R according to the present embodiment correspond to the detection electrode E2 in the basic principle of mutual capacitance touch detection, whereas the first electrodes 23T correspond to the drive electrode E1. With the first electrodes 23T and the first electrodes 23R provided to the same layer, the present embodiment can perform mutual capacitance touch detection.

The present embodiment may also include the second electrodes COML and the third electrodes TDL as described in the embodiments above. With this configuration, the present embodiment can detect the position of a finger or the like in contact with or in proximity to the first surface 21a side of the first substrate 21 based on the basic principle of mutual capacitance touch detection or self-capacitance touch detection. If touch detection is performed with the first electrodes 23T and the first electrodes 23R based on the detection principle of the mutual capacitance method, the present embodiment need not supply the guard signals synchronized with the first drive signals Vp to the second electrodes COML.

The method for driving the first electrodes 23T may be appropriately determined. The first drive signals Vp may be sequentially supplied to the first electrodes 23T, for example. Alternatively, first electrodes 23T arrayed in the row direction may be defined as one drive electrode block, and each drive electrode block may be sequentially driven in the column direction. Still alternatively, first electrodes 23T arrayed in the column direction may be defined as one drive electrode block, and each drive electrode block may be sequentially driven in the row direction.

While exemplary embodiments according to the present invention have been described, the embodiments are not intended to limit the invention. The contents disclosed in the embodiments are given by way of example only, and various changes may be made without departing from the spirit of the invention. Appropriate changes made without departing from the spirit of the invention naturally fall within the technical scope of the invention.

While the first electrodes 23 have a rectangular shape or a strip shape, for example, it is given by way of example only. The first electrodes 23 may be formed into squares, polygons, or zigzag lines, for example. While both of the first electrodes 23 and the second electrodes COML are driven by the first electrode driver 14, they may be driven by different drive circuits. The first electrode driver 14 may supply drive signals to the third electrodes TDL.

What is claimed is:

1. A display device comprising:
   a substrate having a first surface and a second surface opposite to the first surface;
   a plurality of pixel electrodes provided to the first surface side and supplied with a pixel signal for displaying an image;
   a switching element provided to the first surface side and coupled to the pixel electrodes;
   a gate line supplying a scanning signal to the switching element; and
   a first electrode provided between the first surface and the gate line,
   wherein a position of an external object in contact with or in proximity to the second surface side is detected based on a change in capacitance generated between the first electrode and the external object in contact with or in proximity to the second surface side.

2. The display device according to claim 1, wherein the first electrode includes a plurality of wires having electrical conductivity.

3. The display device according to claim 2, wherein the wires extend under the gate line in a direction along an extending direction of the gate line and are provided to a layer closer to the first surface than the gate line.

4. The display device according to claim 2, further comprising: a data line that supplies a pixel signal to the switching element, wherein
   the wires extend under the data line in a direction along an extending direction of the data line and are provided to a layer closer to the first surface than the data line.

5. The display device according to claim 1, wherein the first electrode has lower light transmittance than light transmittance of the substrate.

6. The display device according to claim 1, wherein the switching element includes a semiconductor layer that is disposed between the first electrode and the gate line in a vertical direction perpendicular to the first surface of the substrate in a manner that the first electrode overlaps the gate line.

7. A display device comprising:
   a substrate having a first surface and a second surface opposite to the first surface;
   a plurality of pixel electrodes provided to the first surface side and supplied with a pixel signal for displaying an image;
   a switching element provided to the first surface side and coupled to the pixel electrodes;

a gate line supplying a scanning signal to the switching element;

a first electrode provided between the first surface and the gate line;

a conductor provided to the second surface side of the substrate; and a gap provided between the second surface and the conductor, wherein the conductor, the gap, the substrate, the first electrode, and the switch element are sequentially stacked in a vertical direction perpendicular to the first surface of the substrate, and a distance between the first electrode and the conductor is detected based on a change in capacitance generated between the first electrode and the conductor.

8. The display device according to claim 7, wherein the first electrode includes a plurality of wires having electrical conductivity.

9. The display device according to claim 8, wherein the wires extend under the gate line in a direction along an extending direction of the gate line and are provided to a layer closer to the first surface than the gate line.

10. The display device according to claim 8, further comprising: a data line that supplies a pixel signal to the switching element, wherein the wires extend under the data line in a direction along an extending direction of the data line and are provided to a layer closer to the first surface than the data line.

11. The display device according to claim 7, wherein the first electrode has lower light transmittance than light transmittance of the substrate.

12. The display device according to claim 7, wherein the switching element includes a semiconductor layer that is disposed between the first electrode and the gate line in the vertical direction in a manner that the first electrode overlaps the gate line.

13. A display device comprising:

a substrate having a first surface and a second surface opposite to the first surface;

a plurality of pixel electrodes provided to the first surface side and supplied with a pixel signal for displaying an image;

a switching element provided to the first surface side and coupled to the pixel electrodes;

a gate line that supplies a scanning signal to the switching element;

a first electrode provided between the first surface and the gate line;

a data line that supplies a pixel signal to the switching element;

a second electrode provided to a layer farther from the first surface than the switching element on the first surface side of the substrate; and a third electrode facing the second electrode and provided to the first surface side of the substrate, such that the substrate, the first electrode, the switch element, the second electrode, and the third electrode are sequentially stacked in a vertical direction perpendicular to the first surface of the substrate, wherein at least one of the gate line or the data line is in a floating state where an electric potential is not fixed in a period for detecting an external object in contact with or in proximity to the first surface side with at least one of the second electrode or the third electrode.

14. The display device according to claim 13, wherein the first electrode includes a plurality of wires having electrical conductivity.

15. The display device according to claim 14, wherein the wires extend under the gate line in a direction along an extending direction of the gate line and are provided to a layer closer to the first surface than the gate line.

16. The display device according to claim 14, wherein the wires extend under the data line in a direction along an extending direction of the data line and are provided to a layer closer to the first surface than the data line.

17. The display device according to claim 13, wherein the first electrode has lower light transmittance than light transmittance of the substrate.

18. The display device according to claim 13, wherein the switching element includes a semiconductor layer that is disposed between the first electrode and the gate line in the vertical direction in a manner that the first electrode overlaps the gate line.

* * * * *